(12) United States Patent
Kroke et al.

(10) Patent No.: US 10,308,817 B2
(45) Date of Patent: Jun. 4, 2019

(54) ANTICORROSION LAYER AND PROCESS FOR PRODUCTION THEREOF

(71) Applicant: Technische Universität Bergakademie Freiberg, Freiberg (DE)

(72) Inventors: Edwin Kroke, Halsbrücke (DE); Stefan Pfeifer, Oer-Erkenschwick (DE)

(73) Assignee: EPG Engineered nanoProducts Germany AG, Griesheim (DE)

( * ) Notice: Subject to any disclaimer, the term of this patent is extended or adjusted under 35 U.S.C. 154(b) by 266 days.

(21) Appl. No.: 15/113,439

(22) PCT Filed: Nov. 7, 2014

(86) PCT No.: PCT/EP2014/074093
§ 371 (c)(1),
(2) Date: Jul. 22, 2016

(87) PCT Pub. No.: WO2015/067776
PCT Pub. Date: May 14, 2015

(65) Prior Publication Data
US 2017/0009082 A1  Jan. 12, 2017

(30) Foreign Application Priority Data

Nov. 8, 2013 (DE) .......................... 10 2013 018 755
Nov. 8, 2013 (DE) .......................... 10 2013 018 756

(51) Int. Cl.
*B05D 1/02* (2006.01)
*B05D 1/18* (2006.01)
(Continued)

(52) U.S. Cl.
CPC ................. *C09D 5/08* (2013.01); *B05D 1/02* (2013.01); *B05D 1/18* (2013.01); *B05D 1/28* (2013.01);
(Continued)

(58) Field of Classification Search
CPC ...... C09D 5/08; C09D 183/04; C09D 183/06; C23C 18/1254; C23C 18/122; C08G 77/04; B05D 1/02; B05D 1/18
See application file for complete search history.

(56) References Cited

U.S. PATENT DOCUMENTS 5,902,847 A * 5/1999 Yanagi ................. C09D 201/00
524/269
6,403,164 B1 * 6/2002 Jonschker ................ C09D 4/00
427/387
(Continued)

FOREIGN PATENT DOCUMENTS

CH          621818 A5     9/1981
DE       19813709 A1     9/1999
(Continued)

OTHER PUBLICATIONS

Grigoryan, Stepan G., Avtandilyan S.S., Grigoryan R.S., Balayan Gamlet G., Sol-gel method for preparing porous silica xerogels and modified ceramic monoliths by use of organisols [English title in abstract], The Scientific Technological Centre of Organic and Pharmaceutical Chemistry NAS RA A.L. Mnjoyan Inistitute of Fine Organic Chemistry 26 Azatutyan Str. Yerevan, 0014, Armenia; Chemical Magazine of Armenia, 64, No. 1, 2011.
(Continued)

*Primary Examiner* — Hai Vo
(74) *Attorney, Agent, or Firm* — Michael Soderman

(57) ABSTRACT

The invention relates to a protection layer which is used as anticorrosion layer on corrosion-prone substrates, especially corroding metals, alloys and other materials, especially on steel, and as a basecoat for the application of further porous layer systems or as a topcoat, and to the process for production thereof and to use on a coated substrate for protection against corrosion and specifically for use against microbially induced corrosion (MIC), wherein the anticor-
(Continued)

rosion layer comprises a high-density protection layer on a corrosion-prone substrate, containing pre-condensed layer-forming alkoxysilane precursors, wherein the molecules of the pre-condensed layer-forming alkoxysilane precursors are formed from monomer units selected from the group of the triethoxysilane precursors, wherein the molecules of the pre-condensed layer-forming alkoxysilane precursors are crosslinked with one another, and wherein the high-density protection layer has a layer thickness of at least 50 µm.

6 Claims, 10 Drawing Sheets

(51) Int. Cl.
  B05D 1/28     (2006.01)
  C09D 5/08     (2006.01)
  C08G 77/04    (2006.01)
  C08G 77/18    (2006.01)
  C23C 18/12    (2006.01)
  C09D 183/04   (2006.01)
  C09D 183/06   (2006.01)

(52) U.S. Cl.
  CPC ......... *C09D 183/04* (2013.01); *C09D 183/06* (2013.01); *C23C 18/122* (2013.01); *C23C 18/1225* (2013.01); *C23C 18/1254* (2013.01); *C23C 18/1295* (2013.01); *C08G 77/04* (2013.01); *C08G 77/18* (2013.01); *C23C 18/1241* (2013.01)

(56) References Cited

U.S. PATENT DOCUMENTS

2007/0238257 A1* 10/2007 Paar .................. C09D 5/10
                                                  438/305
2010/0119837 A1    5/2010 Vreugdenhil et al.

FOREIGN PATENT DOCUMENTS

| EP | 0943634 A1 | 9/1999 |
| RU | 2450984 A5 | 5/2012 |
| SU | 621319 A3 | 7/1978 |
| WO | 2009030959 A1 | 3/2009 |
| WO | 2011061290 A1 | 5/2011 |

OTHER PUBLICATIONS

S. Peng, Z. Zeng, W. Zhao, H. Li, Q. Xue, X. Wu, Synergistic effect of thiourea in epoxy-functionalized silica sol-gel coating for copper protection, Surf. Coat. Technol., 2012, 213, 175-182.
T. C. Huang, Y. A. Su, T. C. Yeh, H.-Y. Huang, C.P. Wu, K.Y. Huang, Y.C. Chou, J.M. Yeh, Y. Wei, Advanced anti-corrosive coatings prepared from electroactive epoxy—SiO2 hybrid nanocomposite materials, Electrochim. Acta, 2011, 56, 6142-6149.
R. N. Patil, B.V. Sharma, P.A. Maha, Corrosion Performance of Hybrid Epoxy Resin Coatings with Electrochemical impedance Spectroscopy, Chem. Sin., 2012, 3, 458-467.
M.A. Alam, E.S. M. Sherif, S. M. Al-Zahrani, Fabrication of Various Epoxy Coatings for Offshore Applications and Evaluating Their Mechanical Properties and Corrosion Behavior, Int. J. Electrochem. Sci., 2013, 8, 3121-3131.
J. Kharchenko, I. Beleneva, Evaluation of coatings corrosion resistance with biocomponents as antifouling additives, Corros. Sci., 2013, 72, 47-53.
I.A. Kartsonakis, A.C. Balaskas, E.P. Koumoulos, C.A. Charitidis, G. Kordas, ORMOSIL—epoxy coatings with ceramic containers for corrosion protection of magnesium alloys ZK10, Prog. Org. Coat., 2013, 76, 459-470.
F. Khelifa, M.E Druart, Y. Habibi, F. Benard, P. Leclere, Marjorie Olivier, Philippe Dubois, Sol-gel incorporation of silica nanofillers for tuning the anti-corrosion protection of acrylate-based coatings, Prog. Org. Coat., 2013, 76, 900-911.
A. Kartsonakis, E.P. Koumoulos, A.C. Balaskas, G.S. Pappas, C.A. Charitidis, G.C. Kordas, Hybrid organic-inorganic multilayer coatings including nanocontainers for corrosion protection of metal alloys, Corros. Sci., 2012, 57, 56-66.
F. Andreatta, L Paussa, P. Aldighieri, A. Lanzuttia, D. Raps, L. Fedrizzi, Corrosion behaviour of sol-gel treated and painted AA2024 aluminium alloy, Prog. Org. Coat., 2010, 69, 133-142.

* cited by examiner

ANTICORROSION LAYER AND PROCESS FOR PRODUCTION THEREOF

CROSS REFERENCE TO RELATED APPLICATIONS

This application is the U.S. national stage of International Application No. PCT/EP2014/074093, filed on 2014 Nov. 7. The international application claims the priority of DE 102013018756.7 filed on 2013 Nov. 8 and the priority of DE 102013018755.9 filed on 2013 Nov. 8; all applications are incorporated by reference herein in their entirety.

BACKGROUND

The invention relates to a protective coating which is used as an anti-corrosion coating on substrates which are prone to corrosion, in particular corroding metals and/or their alloys and other materials, in particular as a base coat for the application of further porous coating systems or as a top coat, and to a method for its production and to the use on a coated substrate to protect against corrosion, and in particular for use against microbially influenced corrosion (MIC).

Until now, the problem with MIC corrosion has been countered by using tin paints. These paints, however, have a negative influence on all aquatic life. As a result, the use of paints containing tin has been banned in Europe, Canada and Japan. Copper-containing paints are still in use, but will be banned because of their toxicity. As a result, there is a need for novel paint systems which stop microbially influenced corrosion or substantially reduce the rate of corrosion.

The invention also relates to a sol-gel based anti-MIC coating for protection against corrosion and to the method for its production. The corrosion of steel in marine and onshore environments leads annually to a great deal of damage to structural elements. Depending on the environment, corrosion may have a number of causes.

Specifically, corrosion can be brought about by aqueous media which come into contact with steel. Especially if high concentrations of salt are present at the same time, for example in seawater, corrosion is accelerated. Another influencing factor which results in corrosion is due to the presence of what is known as "MICs" (microbially influenced corrosion). MICs are microorganisms which greatly accelerate corrosion, in particular in steels and ferrous alloys.

In order to characterize and classify the properties of an anti-corrosion coating, the corrosion resistance of the coating may be considered to be the criterion. This is typically determined using electrochemical impedance spectroscopy (EIS).

US 2010/0010119 A1 describes a coating with a curable epoxy resin mixture. The coating contains phyllosilicates functionalized with amino groups. These act as fillers. In that patent, the potential for segregation arises, which gives rise to different corrosion resistances. The corrosion resistance after 30 days is $10^9$ $\Omega cm^2$.

US 2010/0119837 A1 discloses an anti-corrosion coating consisting of an epoxy-functionalized sol-gel network. In that patent, the epoxy acts as a cross-linking agent. Cross-linking is carried out with aromatic diamines. The coat-forming agents are tetraethoxyorthosilicate (TEOS) and tetramethoxyorthosilicate (TMOS). The epoxy used is 3-glycidoxypropyltrimethoxysilane (GPTMS). The cross-linking agent used is primarily phenyldiamine as a mixture of ortho-, meta- and para. The ratio of GPTMS to TMOS is 3:1, for example. The corrosion resistance of the coating is approximately $10^6$ $\Omega cm^2$.

WO 2009/030959 A1 discloses a biologically functional sol-gel system which can be used for reducing/preventing biocorrosion. The system is composed of the components TEOS, methyltriethoxysilane (MTEOS) and GPTMS. The solvent used during production is ethanol. This coating solution may be supplemented with a bacterial suspension after conditioning. In order to ensure the vitality of the integrated microorganisms, it has to be supplied with nutrients. This is provided by means of the porosity of the coating. In order to improve the mechanical stability of the coatings, aluminium oxide particles were added. The resistance of the coating was determined using EIS and was $10^4$ $\Omega cm^2$. One disadvantage of that invention is that the microorganisms are completely surrounded by the gel and thus cannot multiply within the coating. Since microorganisms only have a limited lifetime, the special action of this coating is coupled to the lifetime of the microorganisms in the coating. A further disadvantage is that the coating as a whole is porous due to its method of production. Thus, water can diffuse through the coating and reach the metal, which once more results in (conventional) corrosion of the metal substrate. Furthermore, alcohols are used as the solvent.

The coating in [1] is composed of TEOS and GPTMS. Thiourea is used as the cross-linking agent. The resistance of the coating is $10^5$ $\Omega cm^2$.

An epoxy resin is used in [2]. It is modified with functionalized $SiO_2$ particles. The hybrid material has a corrosion resistance of $10^5$ $\Omega cm^2$.

[3] uses a purely organic epoxy resin coating. The electrochemical impedance measurements carried out on the coatings show that the maximum corrosion resistance of the coating is $10^7$ $\Omega cm^2$.

[4] presents organic epoxy resins. These are based on bisphenol A. No further additives are used. The maximum corrosion resistance is $10^7$ $\Omega cm^2$. The corrosion resistance dropped to $10^6$ $\Omega cm^2$ after immersion for 7 days.

[5] presents a paint based on a vinyl chloride-vinyl acetate copolymer and an epoxy resin. Both variations have a corrosion resistance of approximately $10^8$ $\Omega cm^2$.

In [6], a hybrid material is presented which consists of an epoxy resin and an organically modified silicate. In order to enhance the action as an anti-corrosion agent, inhibitors are integrated into the coating. N-(2-aminoethyl)-3-(trimethoxysilyl)propylamine is used as the silane precursor and supplemented with Araldite GY 257 (epoxy resin) after the former has been hydrolysed. With that coating system, corrosion resistances of less than $10^7$ $\Omega cm^2$ were obtained. Immersion in 3.5% NaCl reduced the corrosion resistance to approximately $10^6$ $\Omega cm^2$ after 12 days.

[7] discloses a hybrid material consist of an acrylate-derived polymer cross-linked with an epoxy-modified silane (GPTMS). TEOS is used as an inorganic coat-forming agent. Depending on the percentage composition of the organic and inorganic components, values of between $10^5$ and $10^8$ $\Omega cm^2$ are measured.

The coating described in [8] is composed of 2-mercaptobenzothiazole, polyaniline, polypyrrole, N-(2-aminoethyl)-3-(trimethoxysilyl)propylamine, diaminodiethylamine as well as an epoxy resin (Araldite GY 257). The maximum resistance obtained is below $10^6$ $\Omega cm^2$.

In [9], zirconium dioxide is used as the coating agent. The coating solution produced and the type of coating technique employed are analogous to that of sol-gel chemistry. The coatings produced in that manner initially have a corrosion resistance of more than $10^{10}$ $\Omega cm^2$, i.e. they have very good anti-corrosive properties. However, on immersion in a 3.5% NaCl solution, in less than 7 days the resistance drops substantially to $10^8$ $\Omega cm^2$.

The coatings in the references mentioned above in part have complicated compositions, in part are porous, and in part contain corrosion inhibitors, and as such are expensive. Solvents are necessary in order to apply the coatings. Purely organic coatings have a comparatively low thermal stability.

Thus, one aim of the present invention is to develop a simple protective coating based on readily accessible and therefore inexpensive starting materials, which coating has a high strength and has a high density, with very good anti-corrosion properties without the use of corrosion inhibitors and (organic) solvents.

The prior art reports the use of microorganisms which, when they metabolize, form components which can be used to prevent MIC.

WO 2010/095146 A1 contains a sol-gel based system which has an anti-corrosive action. In addition to various alkoxysilanes, an inhibitor is also used. In order to synthesize the materials for the coating, alcohols are used as the solvent. The disadvantage is that the use of additional inhibitors makes the system complicated and is associated with costs.

In WO 2011/000339 A2, aluminium oxide particles and epoxy compounds are used as the coating material. In order to prevent bacteria-induced corrosion of steel, a biocide based on pyrithione is used. Pyrithiones are harmful to health and thus cannot be used in open water or in environments. Escape of the biocide into the environment must be avoided at all costs.

In US 2013/0029134 A1, a sol-gel coating is described which essentially consists of an organic and an inorganic precursor. The sol which is produced is supplemented with polyaniline. Polyaniline acts as an anti-corrosive reagent. The disadvantage is that the composite system consists of more than one component, and so the thickness of the coating is difficult to set. Impedance measurements show a maximum resistance of approximately $10^7$ $\Omega cm^2$. Within 10 days, this value dropped to $10^6$ $\Omega cm^2$.

The further aim of the invention is to develop a simple anti-corrosion coating based on readily accessible and therefore inexpensive starting materials without using biocides or other types of harmful anti-MIC chemicals which on the one hand has a high density and, if appropriate, has porous regions with integrated organisms known as anti-MIC organisms which inhibit or kill corrosion-causing organisms (MICs).

SUMMARY

In accordance with the invention, the technical aim is achieved by providing an anti-corrosion coating to protect against corrosion, comprising:

a high-density protective coating on a substrate which is prone to corrosion, preferably metals and/or alloys thereof, containing pre-condensed coat-forming alkoxysilane precursors, wherein the molecules of the pre-condensed coat-forming alkoxysilane precursors are built up from monomer units selected from the group formed by coat-forming alkoxysilane precursors, wherein the molecules of the pre-condensed coat-forming alkoxysilane precursors are cross-linked with each other, wherein the high-density protective coating has a coating thickness of at least 50 µm.

In accordance with the invention, the high-density protective coating formed by an inorganic-organic hybrid material, which is preferably produced without solvents (i.e. without the addition of solvents, in particular organic solvents), consists of at least one coat-forming alkoxysilane precursor, in particular selected from the group formed by trialkoxysilane precursors.

DETAILED DESCRIPTION

In the context of the invention, alkoxysilanes which are used as the coat-forming alkoxysilane precursors are those which contain at least 2 and a maximum of 4 hydrolysable alkoxy groups (OR, wherein R is a $C_{1-4}$ alkyl residue), wherein they are covalently bonded to the silicon atom. Furthermore, the coat-forming alkoxysilanes are characterized in that organic residues ($R_1$ and $R_2$) on the silicon in compounds which contain two $[R_1R_2Si(OEt)_2]$ or three $[R_1Si(OEt)_3]$ hydrolysable groups, wherein $R_1$ and $R_2$ are non-hydrolysable $C_{1-4}$ alkyl residues and/or $C_{6-10}$ aryl residues and are not involved in forming the anti-corrosion coating by chemical reaction or cannot undergo a chemical reaction with other components of the anti-corrosion coating.

Preferably, the coat-forming alkoxysilane precursors are selected from methyltriethoxysilane (MTEOS), tetraethoxyorthosilicate (TEOS), tetramethoxyorthosilicate, methyltrimethoxysilane, dimethyldiethoxysilane, dimethyldimethoxysilane, phenyltriethoxysilane, trimethoxyphenylsilane and trimethoxy(2-phenylethyl)silanes.

In a preferred embodiment of the present invention, the coat-forming alkoxysilane precursor is a trialkoxysilane precursor, but in particular selected from MTEOS, TEOS, tetramethoxyorthosilicate, methyltrimethoxysilane, dimethyldiethoxysilane and phenyltriethoxysilane. More particularly preferably, the coat-forming alkoxysilane precursor is MTEOS.

In accordance with a preferred embodiment of the present invention, coat-forming agents which have been mentioned may be partially substituted by MTEOS or it may completely replace it.

Surprisingly, it has now been discovered that the coat-forming alkoxysilane precursor can be specifically reacted under acidic pH conditions, preferably with cooling to a temperature in the range 0° C. to 10° C., in order to form a pre-condensed coat-forming alkoxysilane precursor. In the context of the present invention, the term "pre-condensed coat-forming alkoxysilane precursor" should in particular be understood to mean a linear and short-chained alkoxysilane, preferably consisting of at least two to 1000 monomer units of the alkoxysilane precursor employed, which comprises residual reactive hydroxy groups or residual hydrolysable alkoxy groups.

By means of thermal or chemical curing to form a high-density protective coating, the residual reactive hydroxy groups or residual hydrolysable alkoxy groups of the molecules of the pre-condensed coat-forming alkoxysilane precursor react together and form a dense network, whereupon the formation of a high-density protective coating is particularly advantageously promoted.

Typically, corrosion-prone substrates for the anti-corrosion coating in accordance with the invention are selected from materials which undergo a natural weathering or decomposition by physical, chemical or biological environmental influences (maritime, continental). Illustrative examples of corrosion-prone substrates in the context of the invention are preferably selected but not limited to metals and/or metal alloys, ceramics, glass, wood, paper and board, natural or synthetic textiles and fibres, polymers and composite materials. The anti-corrosion coating in accordance with the invention can fulfill various functions to protect against external environmental influences. In addition to the preferred use as an anti-corrosion coating on substrates which are prone to corrosion, the coating may also increase the scratch resistance of a substrate, reduce friction or increase it, reduce wear, weathering and fouling (of fouling-prone substrates), and increase the resistance to various chemicals such as organic solvents, acids, bases or other aggressive liquids, gases and solids. Depending on its intended use, the anti-corrosion coating in accordance with the invention may be prepared in a variety of thicknesses, surface coatings and laminated constructions.

Because of the superlative transparency and smoothness (see FIG. 3, for example) of the anti-corrosion coating in accordance with the invention, a gloss effect can be produced with the anti-corrosion coating, and it can protect substrates that need to be protected from environmental influences, whereby the surfaces and morphologies of the substrates remain visible.

Preferably, the corrosion-prone substrate contains a metal and/or a metal alloy. The corrosion-prone substrate may in this regard contain ingredients selected from iron, steel, iron alloys, non-ferrous metals, die cast zinc, die cast aluminium, titanium, titanium alloy, magnesium, die cast magnesium or mixtures thereof, wherein the said metals are preferably in the substrate as an alloying component. Alternatively, the substrate may be a metalized substrate, wherein the surface of the substrate (for example formed from a plastic) may be partially or completely metalized.

Advantageously, an adhesion-promoting intermediate coating, in particular a coating which is disposed between the substrate and the high-density protective coating, can be dispensed with.

In order to improve the adhesion to metallic substrates, an adhesion promoter may be added to the coat-forming agent, the adhesion promoter being based on an epoxy or amine. Preferably, organically modified trialkoxysilanes with the corresponding organic functionalization are used. In accordance with a particularly preferred embodiment of the invention, 3-glycidyloxypropyltriethoxysilane or 3-glycidyloxypropyltrimethoxysilane is used.

In addition, 3-glycidyloxypropyltriethoxysilane (GLYEO) may be added to the particularly preferred triethoxysilane precursor MTEOS of the invention as an additive for the purposes of coat-forming (herein also known as the coat-forming agent). This epoxy-modified silane serves to improve adhesion of the coating to metallic substrates.

The anti-corrosion coating defined above serves to protect corrosion-prone substrates, in particular metals and their alloys. When using construction steels in particular, the formulation presented herein may be used as a protection against corrosion.

In particular, the anti-corrosion coating, in particular the high-density protective coating may additionally comprise adhesion promoters, wherein the following epoxy-functionalized silanes, preferably epoxy-functionalized alkoxysilanes, may be used as adhesion promoters: 3-glycidyloxypropyltrimethoxysilane, 3-glycidoxypropylmethyldiethoxysilane, 3-glycidoxypropylmethyldimethoxysilane, 2-(3,4-epoxycyclohexyl)ethyltrimethoxysilane, 2-(3,4-epoxycyclohexyl)ethyltriethoxysilane.

In addition to the epoxy-functionalized silanes, compounds of this type (i.e. amino-functionalized alkoxysilanes) may also be used as adhesion promoters which are functionalized with amino groups: 3-aminopropyltriethoxysilane, 3-aminopropylmethyldiethoxysilane, aminopropyltrimethoxysilane, (3-trimethoxysilylpropyl)diethylentriamine, aminoethylaminopropyltrimethoxysilane, aminoethylaminopropyltriethoxysilane, aminoethylaminopropylmethyldimethoxysilane.

In general, it has been shown that a coating in accordance with the invention may also be used without the addition of adhesion promoters. However, the long-term stability and the adhesion of the coating is substantially increased. It has been shown that 0.5% to 30% of the adhesion promoter with respect to the weight of the coat-forming alkoxysilane precursors may be employed. Particularly preferably, the anti-corrosion protection formulation in accordance with the invention contains up to 20% by weight of adhesion promoter. In particular, excellent results are obtained with a ratio of MTEOS to GLYEO of 97:5. An advantage of the coating substrate which should be highlighted is that when synthesizing a coating solution suitable for coating, the use of solvents can be dispensed with. In order to condition the precursors used, only water which is used for hydrolysis of the precursors and a catalyst are required. The hydrolysis of the coat-forming alkoxysilane precursors and the formation of the sol (for example of the anti-corrosion protection formulation) are carried out in an acidic medium. The catalyst used may be hydrochloric acid, nitric acid, phosphoric acid or acetic acid. In particular, the use of hydrochloric acid provides a sol which can be used as a coating in a relatively short reaction time (approximately 12 hours), which sol can be stored in a stable and unaltered manner over a period of at least one month, preferably at least four months, at temperatures of up to 40° C.

In accordance with the invention, water is used in a stoichiometric ratio with respect to the hydrolysable alkoxy groups of the coat-forming alkoxysilane precursors employed. Here, the maximum molar quantity of water corresponds to the number of hydrolysable alkoxy groups ($H_2O:OR=1:1$), or is added in a below-stoichiometric quantity. The minimum quantity of water in this regard is not less than 50% of the maximum quantity ((1:0.5). Thus, the water is acting solely for the purposes of hydrolysis of the precursors employed, and not as a solvent.

Independently of the application and curing method, coating thicknesses of >200 μm can be obtained with the anti-corrosion protective formulation as the coating substrate. Preferably, the high-density protective layer has a coating thickness of at least 100 μm, preferably in the range 100 to 250 μm. In particular, coating thicknesses of between 100 μm and 150 μm demonstrate very good corrosion resistance.

One advantage of the protective coating is that a very dense protective coating is obtained from a composition in the form of a very simple sol-gel system without the need for further additives. Particularly advantageously, the high-density protective coating does not require the application of a primer coating for it to adhere to the substrate.

The person skilled in the art will understand that the term "high-density protective coating" means a coating with a low defect density, and therefore a coating which has no structures such as fractures, agglomerates or pores with dimensions in the millimetric or micrometric range and which behaves in an inert manner towards environmental materials (for example MICs, water, oxygen) and/or does not absorb them. FIGS. 2 and 3 show examples of a high-density protective coating with a low defect density.

Surprisingly it has been found that the transparency of the protective coating in accordance with the invention (determined, for example, using a "haze-gard plus" from BYK-Gardner GmbH) is in the range 40% to 70% using an ASTM industry standard.

The anti-corrosion coating proposed here, in particular the protective coating in accordance with the invention, carries out its anti-corrosion action substantially without the addition of any fillers and can thus advantageously be used as a transparent lacquer with the option of adding fillers which in particular serve to adapt it to the application method and also to adapt the optical appearance of the paint.

It is also possible to embed fillers, in particular particulate materials to improve the mechanical stability of the coating, into the protective coating. In this regard, silicon dioxide, titanium dioxide, aluminium oxide, zinc oxide, and also wollastonite, talc, kaolin, calcium carbonate as well as graphite, nanotubes, fullerenes or other carbon-based fillers may be employed. Preferably, 0.5-22.5% by weight of said particulate materials with respect to the solids content of the coating material may be employed. Organic fillers, in particular anti-MIC organisms from the anti-MIC organism spore-forming group, may be embedded in the high-density protective coating as a particulate material.

Furthermore, the mechanical, electrical, magnetic, optical, chemical and biomedical properties of the anti-corrosion coating of the invention may be varied within wide limits by adjusting the production parameters, and in particular by the addition of active and passive fillers.

Furthermore, it is possible to embed coloured pigments which are known to the person skilled in the art in order to provide a colour. Without the addition of coloured pigments, the coating system is colourless and transparent after curing.

The investigations into this coating system have demonstrated a very good and long-lasting protection against (conventional) corrosion. Particularly advantageously, the protective coating in accordance with the invention exhibits an initial corrosion resistance in the range $10^9$ to $10^{11}$ $\Omega cm^2$ which is not significantly reduced upon immersion or contact with aqueous media.

Since a two-coat system is used for the production, the protective coating can be optimized for the purposes of thermal curing without having to be concerned about the limited temperature stability of anti-MIC microorganisms.

In addition to protecting against corrosion, the protective coating in accordance with the invention also provides the chemical conditions necessary to be able to apply a porous coating system.

Thus, in a further aspect of the invention, a porous coating system with integrated so-called anti-MIC organisms is also provided, which inhibits the growth of and/or kills corrosion-causing organisms (MICs).

In accordance with this further aspect of the present invention, the anti-corrosion coating has a porous coating system with 1 to 200 μm, preferably 5 to 200 μm, particularly preferably 50 to 200 μm open pores, wherein the porous coating system is applied to the high-density protective coating, wherein the porous coating system is formed from a cross-linked alkoxysilane precursor and anti-MIC organisms colonize the pores. The basic principle is illustrated in FIG. 1.

In accordance with the invention, the porous coating system contains, without a solvent, an alkoxysilane precursor, in particular selected from MTEOS, TEOS, tetramethoxyorthosilicate, methyltrimethoxysilane, dimethyldiethoxysilane and phenyltriethoxysilane. More particularly preferably, the coat-forming alkoxysilane precursor is MTEOS.

In addition, the porous coating system may be provided with a top coat which narrows the pores. FIG. 6 shows, by way of example, the pore-narrowing top coat in accordance with the invention on the porous coating system. The pore-narrowing top coat is primarily formed from an alkoxysilane precursor as described above, in particular selected from methyltriethoxysilane (MTEOS), TEOS, tetramethoxyorthosilicate, methyltrimethoxysilane, dimethyldiethoxysilane and phenyltriethoxysilane.

The synthesized anti-corrosion protection formulation of the invention may be applied to the substrate using various techniques which are known to the person skilled in the art. In particular, dip coating and brush application are suitable methods for applying the anti-corrosion protection formulation to the substrate. Examples of other methods which may be used for coating the substrates, in particular metallic substrates, are by roller, squeegee, spin coating, float coating and spray coating. In particular, the anti-corrosion protection formulation is applied by dip coating, drop application, trowelling or brush application.

In order to cure the anti-corrosion protective formulation, circulating air ovens (for example heating cabinets) and also infrared emitters have been shown to be suitable. Both methods produced good results. In particular, when drying with IR emitters, compared with curing in a circulating air oven, very short curing periods and slightly enhanced properties of the coatings are obtained in respect of the corrosion resistance.

Preferably, thermal curing is carried out in an oven or using IR emitters at temperatures of >80° C., but preferably below 160° C.

Preferably, the porous coating serves to integrate microorganisms and also spores into the porous coating system and to immobilize them. In this regard, it should be ensured that the metabolism of the microorganisms is not compromised. The method in accordance with the invention for the production of the porous coating system advantageously ensures that when the porous coating system is produced, the microorganisms or spores are not inactivated by the processes which have to be carried out. In this regard, the substances required (for example nutrients) which are essential for the metabolism of the microorganisms or spores can be added to the coating, whereupon the organisms remain biologically active and after the production process advantageously form the antimicrobial substances that produce an anti-corrosion effect against microorganisms which induce corrosion (MICs). Moreover, the pores in the coating system have to be large enough for the microorganisms to be able to multiply. In this regard, a longer-lasting antimicrobial action is produced than with coating systems into which the microorganisms are embedded in a manner such that there is not enough space for colonisation. By successfully embedding the microorganisms or spores and supplying them with nutrients, the organisms can metabolize so as to obtain the desired antibacterial effect. In the context of the invention, those organisms may be understood to be those which form one or more metabolites via their metabolization which have an antibacterial effect and thus can inhibit the growth of other organisms, in particular those which are responsible for microbially influenced corrosion or the fouling process, or which may develop an antibiotic effect. Several organisms which could be used for this particular purpose are known in the literature. Preferred anti-MIC organisms for integration into such a coating system are known, for example, from L. D. Chambers et al. (Surface & Coatings Technology 2006, 201, 3642-3652) and in particular are

*Bacillus pumilus, Pseudomonas* sp., *Bacillus licheniformis* and *Bacillus subtilis* as well as genetically modified *E. coli*.

In this regard, spore-forming organisms such as *Bacillus pumilus, Bacillus licheniformis* and *Bacillus subtilis* may in particular be used because during application, the spores can advantageously tolerate much higher temperatures and wider pH ranges. Advantageously, when using spore forming organisms, adjusting the pH during the production process is irrelevant.

In an alternative preferred embodiment of the invention, the porous coating system is charged with microorganisms directly after curing by applying a suspension containing anti-MIC organisms. The porous coating system is thus infiltrated with the anti-MIC organisms.

The porous coating is advantageously formed from a coating material which can be produced by basic hydrolysis of MTEOS. In this regard, this triethoxysilane precursor is supplemented with an ammoniacal solution without adding a solvent and at ambient temperature, with stirring. In this reaction, particles which form an extremely porous coating are produced. In order to bind the microorganisms in the coating system better, it is advantageous to narrow the pores in a top coat in a manner such that the microorganisms cannot escape through them. The diffusion of nutrients into the coating as well as the diffusion of metabolites from the coating is not affected by the narrowing.

In the context of the present invention, the person skilled in the art will understand the term "MIC" to be an acronym for the microbially influenced corrosion of metals. Microbially influenced corrosion generally describes the influence of microorganisms on the kinetics of corrosion processes in metals which are accompanied by the adhesion of microorganisms to the metal interfaces (also known as a "biofilm").

The person skilled in the art is well aware of corrosion-causing microorganisms (herein also termed MICs), i.e. which contribute to the MIC, and in relation thereto will classify them as substrates or electron acceptors which are capable of metabolization. Preferably, MICS are selected from the group of sulphate-metabolizing bacterial strains, preferably *Thiobacillus, Thiothrix, Desulfovibrio desulfuricans, Desulfomaculum ruminis, Desulfonema limicola*, sulphur-metabolizing bacterial strains, in particular *Desulfuromonas acetoxidans*, iron-oxidizing/reducing bacterial strains, in particular *Alteromonas putrefaciens*, and magnesium-oxidizing bacterial strains, in particular *Shewanella putrefaciens* and *Geobacter* sp.

An essential advantage of the invention is the unique synthesis of the coating substances. Both the protective coating and the porous coating system may be produced, without the addition of solvents, from the same alkoxysilane precursor (mixture). In this manner, environmentally-friendly synthesis is obtained. Since solvents can be dispensed with, production of the coating solutions is also inexpensive. A further advantage is that organic solvents are avoided, since the anti-MIC microorganisms usually cannot survive in organic solvents.

The porous coating systems described above may have a very high (open) porosity and large pore diameter (50-200 µm). In this manner, it is possible to introduce a high concentration of microorganisms into the coating. Because of the nature of the coating system, vital nutrients can diffuse into the coating and metabolites can diffuse out of the coating. In this manner, the microorganisms remain active and can reproduce, which again results in a significantly longer service life, in contrast to the prior art. Since a protective coating is used, even after the microorganisms have lost their activity, the anti-corrosive activity still persists.

Depending on the anti-MIC organisms used (microorganism/spore), integration may be carried out in a variety of steps of the method. In the case of spores, the anti-MIC organisms can be mixed directly with the appropriate anti-corrosion protective formulation, applied to the substrate and processed. Spores can typically survive temperatures of up to 80° C. for 30 minutes. In accordance with a particularly preferred embodiment of the present invention, the high-density protective coating comprises anti-MIC organisms from the group formed by spore forming anti-MIC organisms.

After the coating has been applied and cured, anti-MIC organisms which are not present as spores are applied to the coating by means of a bacterial suspension. So that the microorganisms cannot escape from the porous coating system, the surface is closed or the pore size is modified such that the organisms cannot diffuse through, by means of a further porous coating which cures at low temperatures. Spores may be processed in the same manner, but this is not preferred. The further porous coatings with small pore diameters are produced in a manner such that after completion of the synthesis, the reaction mixture is acidified. This causes the formation of agglomerates which, when applied as the coating system, have pores with a pore diameter of less than 5 µm. Depending on the agglomeration, in addition to narrowing the pores, the effective curing temperature is advantageously reduced. Curing may be carried out at temperatures of between 40° C. and 80° C.

In order to fix the anti-MIC organisms better in the porous coating system, the pores in a top coat should be narrowed in a manner such that the microorganisms can no longer pass through it. In accordance with a further preferred embodiment of the present invention, a further porous coating is applied to the porous coating system as a pore-narrowing or porous top coat formed from cross-linked alkoxysilane precursors, wherein the further porous coating has pores with a smaller pore diameter of less than 5 µm.

In accordance with a further preferred embodiment of the present invention, the high-density protective coating in accordance with the invention consists of an inorganic-organic hybrid material, produced in a solvent-free manner from an alkoxysilane precursor onto which a porous coating system with open pores with a size of 5 to 200 µm is applied, and wherein anti-MIC organisms colonize these pores. The alkoxysilane precursor here is preferably methyltriethoxysilane and/or tetraethoxyorthosilicate and/or tetramethoxyorthosilicate and/or methyltrimethoxysilane and/or dimethyldiethoxysilane and/or phenyltriethoxysilane.

In accordance with this embodiment, the high-density protective coating contains up to 20% by weight of adhesion promoter, wherein the adhesion promoter is preferably an epoxy-functionalized alkoxysilane or amino-functionalized alkoxysilane, in particular selected from 3-glycidyloxypropyltriethoxysilane and/or 3-glycidyloxypropyltrimethoxysilane and/or 3-glycidoxypropylmethyldiethoxysilane and/or 3-glycidoxypropylmethyldimethoxysilane and/or 2-(3,4-epoxycyclohexyl)ethyltrimethoxysilane and/or 2-(3,4-epoxycyclohexyl)-ethyltriethoxysilane and/or 3-aminopropyltriethoxysilane and/or 3-aminopropylmethyldiethoxysilane and/or aminopropyltrimethoxysilane and/or (3-trimethoxysilylpropyl)diethylentriamine and/or aminoethylaminopropyltrimethoxysilane and/or aminoethylaminopropyltriethoxysilane and/or aminoethylaminopropylmethyldimethoxysilane.

Preferably, the porous coating consists of a coating material which is obtained by solvent-free basic hydrolysis of MTEOS.

The present invention also pertains to a method for producing an anti-corrosion coating with a high-density protective coating on a substrate which is prone to corrosion, preferably metallic and/or an alloy thereof, comprising the following steps:
a) providing an anti-corrosion protection formulation wherein at least one coat-forming alkoxysilane precursor is reacted, without the addition of solvents, by adding water in a molar ratio to the alkoxysilane precursor in the range 3:1 to 1:1, under acidic pH conditions and at a temperature in the range 0° C. to 10° C., in order to form a pre-condensed coat-forming alkoxysilane precursor,
b) applying the anti-corrosion protection formulation to a substrate, and
c) curing the applied anti-corrosion protection formulation to form a protective coating.

In accordance with a preferred embodiment of the present invention, water in a molar ratio to the alkoxysilane precursor in the range 3:1 to 1:1, particularly preferably 3:1 to 2:1, more particularly preferably 2.7:1 to 2.2:1, is added to the coat-forming alkoxysilane precursor in step a) of the method in accordance with the invention.

It may be appropriate for the anti-corrosion protective formulation to be supplemented with an adhesion promoter. In this regard, the adhesion promoters are preferably the epoxy-functionalized silanes and/or the silanes functionalized with amino groups cited above.

Advantageously, it has now been discovered that the inventive formation of sols for the production of the high-density protective coating in the acidic pH range results in the formation of pre-condensed coat-forming alkoxysilane precursors.

The hydrolysis and formation of the sol for the production of the high-density protective coating are carried out in the acidic pH range. Hydrochloric acid, nitric acid, phosphoric acid or acetic acid may be used as the acidic catalyst. In particular, using hydrochloric acid results, in a relatively short reaction period (approximately 12 hours), in a sol which is capable of being coated which can be used unchanged over a period of stability of 6 months and which can be stored safely at temperatures of up to 40° C. Preferably, the acidic pH conditions in the anti-corrosion protection formulation are set by adding hydrochloric acid, nitric acid, phosphoric acid or acetic acid.

In accordance with the invention for the production of a high-density protective coating as the alkoxysilane precursor, MTEOS, tetraethoxyorthosilicate, tetramethoxyorthosilicate, methyltrimethoxysilane, dimethyldiethoxysilane and phenyltriethoxysilane are used. Particularly preferably, MTEOS is used as the coat-forming alkoxysilane precursor.

It has been shown that the acid pH conditions in step a) of the method in accordance with the invention are preferably adjusted by adding an acidic catalyst in a ratio of water to acidic catalyst of 1 to 0.0001 to 1 to 0.01.

The synthesized anti-corrosion protection formulation may be applied to the substrate using various techniques which are known to the person skilled in the art. In particular, dip coating, drop application, trowelling or brush application are suitable methods for applying the anti-corrosion protection formulation to the substrate. Examples of further methods which may be used for coating the substrates, in particular metallic substrates, are rollers, squeegees, spin coating, float coating and spray coating. In particular, the anti-corrosion protection formulation is applied by dip coating, drop application, trowelling or brush application.

In an alternative preferred embodiment of the method in accordance with the invention, the anti-corrosion protection formulation is applied by spray coating in an atomized spray. Alternatively, the anti-corrosion protection formulation can be applied by painting with strokes of a brush.

In order to cure the anti-corrosion protective formulation, circulating air ovens (for example heating cabinets) and also infrared emitters have been shown to be suitable. Both methods provided very good results. In particular, when drying with IR emitters, compared with curing in a circulating air oven, very short curing periods and slightly enhanced properties of the coatings were obtained as regards the corrosion resistance.

Preferably, thermal curing is carried out in an oven or using IR emitters at temperatures of >80° C., but preferably below 160° C., since at temperatures >160° C., defects may occur due to embrittlement of the applied coating. The maximum curing temperature which can be applied is 200° C.

In accordance with a particularly preferred embodiment of the method in accordance with the invention, the anti-corrosion protection formulation is cured by means of thermal curing at a temperature between 60° C. and 200° C. to form a high-density protective coating.

Surprisingly, it has now been discovered that by using bases to pre-condense coat-forming alkoxysilane precursors, for example in the anti-corrosion protection formulation, the residual reactive hydroxyl groups or residual hydrolysable alkoxy groups react together and form a dense network, whereupon particularly advantageously, the formation of a high-density protective coating is favoured.

In addition to thermal curing, the coat-forming may also be initiated and carried out chemically. The curing process is based on the fact that the sol cross-links to form a dense material whereby simultaneously, water is forced out of the coating system which is being formed by the shrinkage which occurs. This can be brought about in a particularly effective and swift manner by adding bases, for example ammonium hydroxide solution, amino-functionalized alkoxysilanes such as aminopropyltriethoxysilane or basic amino acids such as arginine, lysine and histidine. Furthermore, basic macromolecules such as polyaniline, for example, or amino-functionalized polysiloxanes may be used as bases for chemically curing the coating. To cure the coatings chemically at ambient temperature, ammonium hydroxide solutions are preferably used. The rate at which the anti-corrosion protection formulation cures is dependent on both the concentration of the base used and also on the quantity of water involved. As an example, FIG. 6 shows the curing times for a 28% ammonium hydroxide solution as a function of the quantity of ammonium hydroxide solution used.

Furthermore, primary, secondary and tertiary amines may be used as the cited bases. Primary amines with general formula: $NH_2$—$R_3$, wherein $R_3$ is a $C_{1-8}$ alkyl residue which may or may not be branched; secondary amines with general formula: NH—$R_3R_4$, wherein $R_3$ and $R_4$, independently of each other, are a $C_{1-8}$ alkyl residue which may or may not be branched; the residues may have the same alkyl chain length, or their lengths may be different; and tertiary amines with general formula: N—$R_3R_4R_5$, wherein $R_3$, $R_4$ and $R_5$, respectively independently of each other, are $C_{1-8}$ alkyl residues, which may or may not be branched.

Preferably, bases of this type and their aqueous solutions are used, in which the basic components are readily and completely vaporizable.

The concentration of the base used in the method in accordance with the invention is advantageously 1% to 50% by volume, particularly preferably 5% to 35% by volume. In a particularly preferred embodiment of the method in accordance with the invention, the base is in water as the exclusive solvent.

In accordance with a preferred embodiment of the method in accordance with the invention, chemically initiated curing is carried out by adding bases, in particular at temperatures in the range 5° C. to 40° C., so that to produce the anti-corrosion coating, high temperature steps of above 80° C. can be dispensed with; preferably, deposition occurs at temperatures in the range 5° C. to 40° C.

In experiments regarding the production of an anti-corrosion coating in accordance with the invention using the method in accordance with the invention, it was discovered that the ratio of the anti-corrosion protection formulation to the base used is crucial to the curing times and the density of the target anti-corrosion coating. In this regard, it has been shown that after application of the anti-corrosion protection formulation, a ratio of anti-corrosion protection formulation to base in the range 1:0.001% to 1:1% by volume, particularly preferably in the range 1:0.05% to 1:0.1% by volume in particular results in particularly dense corrosion coatings and at the same time with acceptable curing times.

Preferably, the anti-corrosion protection formulation applied to the substrate undergoes a shrinkage which is in the range 10% to 90% upon thermal and/or chemical curing.

In the case of epoxy containing sols, curing is also possible by adding the following amino-functionalized alkoxysilanes to the sol:
3-aminopropyltriethoxysilane, 3-aminopropylmethyldiethoxysilane, aminopropyltrimethoxy-silane, (3-trimethoxysilylpropyl)diethylentriamine, aminoethylaminopropyltrimethoxysilane, aminoethylaminopropyltriethoxysilanes, aminoethylaminopropylmethyldimethoxysilanes.

Furthermore, aminosilanes of the type $SiR_x(NR_6R_7)_{4-x}$ may be used for chemical curing, wherein $R_x$ corresponds to $C_{1-8}$ alkyl residues which may or may not be branched, wherein the number of alkyl residues is between 0 and 3 and wherein $R_6$ and $R_7$, independently of each other, are $C_{1-8}$ alkyl residues which may or may not be branched. Preferably, the amines used are those which can be vaporised at less than 100° C. at normal pressure.

The anti-corrosion protection formulation for the production of the high-density protective coating or the porous coating system may be applied both as a 1-component (cpt) system and also as a 2-cpt system by spray coating. Since the stability on storage of the coating solution, as can be seen in FIG. 6, is shortened substantially as a 1-cpt system, coating is preferably carried out with a 2-cpt system. Preferably, the anti-corrosion protection formulation is applied as a coating solution with an external mixing system. In this regard, both components of the anti-corrosion protection formulation are mixed in the atomized spray and applied. The mixing ratio is set on the basis of FIG. 6 and the intended curing period. The target coating thickness for the high-density protective coating can be adjusted by applying the anti-corrosion protection formulation in one coating step or in a plurality of cycles. Preferably, the anti-corrosion protection formulation is applied in 2-10 spray cycles.

In accordance with a preferred embodiment of the present invention, a porous coating system may be applied to the high-density protective coating obtained in particular in accordance with step c) of the method in accordance with the invention, by means of the following steps:

a) providing a formulation for the porous coating system wherein an ammoniacal solution is added to at least one coat-forming alkoxysilane precursor without the addition of solvents, adding water in a molar ratio of 1:1 to 1:3, at ambient temperature and with stirring,
b) applying the formulation for the porous coating system to the protective coating and
c) curing the applied formulation for the porous coating system.

In order to fix the anti-MIC organisms better in the porous coating system, the pores in a top coat could appropriately be narrowed in a manner such that the microorganisms cannot pass through it. In accordance with a preferred embodiment of the present invention, a further porous coating is applied to the porous coating system, by means of the following steps:

a) acidifying the formulation for the porous coating system, wherein an ammoniacal solution is added to at least one coat-forming alkoxysilane precursor without the addition of solvents, adding water in a molar ratio of 1:1 to 1:3, at ambient temperature and with stirring,
b) applying the formulation for the porous top coat to the porous coating system, and
c) curing the applied formulation in order to generate the porous top coat, wherein the porous top coat has pores with a pore diameter of less than 5 μm.

In accordance with an alternative preferred embodiment of the method in accordance with the invention for the production of the anti-corrosion coating in accordance with the invention, the alkoxysilane precursor to which an adhesion promoter may be added is transformed into a coating solution by adding water under acidic conditions and with cooling, the coating solution is applied to the substrate and thermally cured, whereupon a porous coating is applied to the protective coating which is obtained in this manner, which porous coating is produced by adding ammoniacal solution to a MTEOS precursor without the addition of solvent, at ambient temperature and with stirring, coating solution which is formed by the reaction is applied to the protective coating and thermally cured and then embedded with anti-MIC organisms.

In this regard, the acidic conditions are obtained during the production of the protective coating by adding hydrochloric acid, nitric acid, phosphoric acid or acetic acid.

In accordance with this preferred embodiment of the method in accordance with the invention, the solvent-free anti-corrosion protection formulation for the production of the high-density protective coating is applied to the substrate by dip coating, brush application, roller, squeegeeing, spin coating, float coating or spray coating. To produce the porous coating, the corresponding anti-corrosion protection formulation is applied to the substrate by dip coating, drop application, trowelling or brush application.

Curing is advantageously carried out by thermal curing, wherein this is carried out in particular in an oven or by means of IR emitters.

In a further aspect, the invention also concerns a solvent-free anti-corrosion protection formulation under acidic conditions as defined above and below, containing at least one pre-condensed coat-forming alkoxysilane precursor, by reacting:

at least one coat-forming alkoxysilane precursor selected from the group formed by the alkoxysilane precursors cited above, without the addition of solvents,
adding water as a reagent in a molar ratio of 1:1 to 1:3, under acidic pH conditions,
at a temperature in the range 0° C. to 10° C.

In a preferred embodiment of the invention for the production of the solvent-free anti-corrosion protection formulation in accordance with the invention, the water is added as a reagent in a molar ratio of 1:3 to 1:1, particularly preferably 1:3 to 1:2, more particularly preferably 1:2.2 to 1:2.7.

It has been shown that an anti-corrosion protection formulation which is particularly stable upon storage contains an acidic catalyst in a ratio of water to acidic catalyst of 1 to 0.0001 to 1 to 0.01. An anti-corrosion protection formulation prepared in this manner has a viscosity (determined, for example, using a CVO 1200 Rheometer, Bohlin Instruments) in the range 180 to 700 mPas.

In accordance with the invention, MTEOS, tetraethoxyorthosilicate, tetramethoxyorthosilicate, methyltrimethoxysilane, dimethyldiethoxysilane and phenyltriethoxysilane are used as the alkoxysilane precursor to produce the solvent-free anti-corrosion protection formulation in accordance with the invention. More particularly preferably, the coat-forming alkoxysilane precursor is MTEOS.

In this regard, it can primarily also be seen that after mixing all of the individual components and subsequent formation of the pre-condensed coat-forming alkoxysilane precursor, the volatile components formed as by-products during the production, in particular water, alcohols (HOR) released from the reaction and catalyst components may be removed from the anti-corrosion protection formulation in accordance with the invention. The volatile components may be removed using methods which are known to the person skilled in the art such as, for example, by applying a vacuum.

In a further aspect of the present invention, the anti-corrosion protection formulation is in the form of a 2-component (cpt) kit for the production of an anti-corrosion coating in accordance with the invention, in particular on a substrate which is prone to corrosion, in particular metals and/or alloys thereof, containing
a) a solvent-free anti-corrosion protection formulation under acidic pH conditions as defined above, as component A, containing at least one pre-condensed coat-forming alkoxysilane precursor, by reacting:
at least one coat-forming alkoxysilane precursor selected from the group formed by the alkoxysilane precursors cited above, without the addition of solvents,
adding water as a reagent in a molar ratio of 1:1 to 1:3, under acidic pH conditions,
at a temperature in the range 0° C. to 10° C. and
b) a component B containing a base, for chemically initiated curing.

In accordance with a preferred embodiment of the present invention, the component A comprises water in a molar ratio of alkoxysilane precursor to water in the range 1:3 to 1:1, particularly preferably 1:3 to 1:2, more particularly preferably 1:2.2 to 1:2.7.

It has been shown that a component A which is particularly stable to storage comprises an acidic catalyst in a ratio of water to acidic catalyst of 1 to 0.0001 to 1 to 0.01. A component A prepared in this manner has a viscosity (determined, for example, using a CVO 1200 Rheometer, Bohlin Instruments) in the range 180 to 700 mPas.

Alternatively, after mixing all of the individual components and subsequent formation of the pre-condensed coat-forming alkoxysilane precursor, the volatile components formed as by-products during the production, in particular water, released alcohols and catalyst components, are removed from the component A. Removal of the volatile components may be carried out using methods which are known to the person skilled in the art such as, for example, by applying a vacuum.

The bases of component B act to carry out the chemically initiated curing to form the coating. The ammonium hydroxide solutions, amino-functionalized alkoxysilanes, basic amino acids, as well as primary, secondary and tertiary amines cited above have been shown to be particularly effective bases. Preferably, bases of this type and their aqueous solutions are used in component B, in which the basic components are readily and completely vaporizable. Furthermore, basic polymers which can vaporize under normal pressure and temperatures between 30° C. and 100° C. may be used. Examples of basic polymers are polyaniline or amino-functionalized silicones.

The volume fraction of the base in the component B of the invention is preferably 1% to 50% by volume, particularly preferably 5% to 35% by volume. In a particularly preferred embodiment of the kit in accordance with the invention, the component B comprises exclusively water as the solvent in addition to the base.

In experiments concerning the production of an anti-corrosion coating in accordance with the invention by applying component A and component B of the kit in accordance with the invention, it was discovered that the ratio of the two components is crucial to the curing times and the density of the anti-corrosion coating. In this regard, it was shown that when applying the individual components A and B of the kit in accordance with the invention, a particular ratio of component A to component B in the range 1:0.001% to 1:1% by volume, particularly preferably in the range 1:0.05% to 1:0.1% by volume resulted in particularly dense corrosion coatings for the same representative curing times.

Preferably, the anti-corrosion coating produced in accordance with the invention is coated using a kit in accordance with the invention by means of spray coating in an atomized spray, so that in order to produce the anti-corrosion coating, high temperature steps of more than 80° C. can be dispensed with; preferably, deposition occurs at temperatures in the range 5° C. to 40° C. Particularly advantageously, when applying by means of spray coating, the components A and B of the kit in accordance with the invention are sprayed in the appropriate ratio separately or, as is preferable, at the same time.

Alternatively, the kit may also be applied by brush application. In this regard, the components A and B of the kit in accordance with the invention are mixed together in the appropriate ratio prior to application to the substrate.

FIG. 13 shows an example of the curing process for the 2-component kit in accordance with the invention. Curing of the coating may be divided into three phases. In the first curing phase, the solvent-free anti-corrosion protection formulation as component A is mixed with the curing component as component B. This mixing may, for example, be carried out in an atomized spray of a 2-component spray gun. As an alternative to spray application, the liquids of the two components may be mixed immediately prior to application and then the mixed components of the 2-component kit are applied to the surface of the substrate to be coated. In both cases, hydrolysis of the residual alkoxy groups of the pre-condensed coat-forming alkoxysilane precursor occurs in the coating solution, as well as condensation of silanol groups. In this regard, the applied coating solution slowly solidifies. As the viscosity of the applied solution increases, the coating passes into the second curing phase. Because of the cross-linking of the material, in particular of the pre-condensed coat-forming alkoxysilane precursors, the applied coating shrinks. As shrinking progresses, both the alcohol formed during condensation and hydrolysis (for example ethanol when using MTEOS) and water are forced out of the coating and vaporise on the surface. In the subsequent third phase, the applied coating densifies further and the maximum coating consistency is obtained. The last phase is completed after the surface is no longer sticky and water can no longer be taken up by the coating.

The second curing phase can be considered to be critical since if the proportions of component B are too high, formation of the coating could be impaired. This might result in undesirable porous and/or fractured coatings.

The invention also concerns a coated substrate, in particular a coated part, which comprises at least one anti-corrosion coating in accordance with the invention on a substrate which is prone to corrosion, in particular metals and/or their alloys. Preferably, the coated parts are sheets, steel beams, pipes, corrosion-prone constructions, bodywork, ships hulls, tanks, and structural steel. In this regard, parts coated in this manner may be used in various branches of industry, for example for facades, in metalwork, for vehicles and in general mechanical engineering. Preferably, the coated part is used in the metalworking, civil engineering, shipping and automobile industry in gears, engines and bodywork areas. The anti-corrosion coating in accordance with the invention may be used in a variety of consistencies, surface coatings and layered structures which are suitable for the respective application.

Furthermore, the present invention also concerns the use of the anti-corrosion coating in accordance with the invention for protection against corrosion on substrates which are prone to corrosion, preferably metals and/or their alloys.

The invention also concerns the use of the anti-corrosion coating in accordance with the invention for the protection of corrosion-prone substrates, preferably, but not limited to, metals and/or their alloys, ceramics, glass or materials such as wood, paper or board, natural or synthetic textiles and fibres, composites and/or polymers, to combat corrosion or to improve specific properties of the respective substrate employed.

In addition to the preferred use of the anti-corrosion coatings in accordance with the invention to protect against external environmental influences which in particular trigger corrosion, the anti-corrosion coating in accordance with the invention may also increase the scratch resistance of a substrate, reduce friction or increase it, reduce wear, prevent weathering and fouling (of substrates prone thereto), or increase the resistance to various chemicals such as organic solvents, acids, bases or other aggressive liquids, gases and solids.

Because the anti-corrosion coating in accordance with the invention acts as an electrical insulator, alternatively and preferably, it may be used as an insulating coating on a substrate.

Because of the excellent transparency and smoothness of the anti-corrosion coating in accordance with the invention, the anti-corrosion coating is of particular application as a clear lacquer coating, wherein particularly advantageously, the surfaces and morphologies of the substrates remain visible.

The invention will now be illustrated in more detail with the aid of some exemplary examples and the accompanying drawings. The following examples serve to further illustrate the invention without limiting the invention thereto.

DETAILED DESCRIPTION OF THE PREFERRED EMBODIMENTS

Example 1—Synthesis of Coating Formulation 57 g of methyltriethoxysilane (MTEOS) and 3 g of GLYMO were placed in a 100 mL round bottom flask. The reaction solution was then cooled in an ice bath to 5° C. After the desired temperature had been reached, 9 mL of $H_2O$ was slowly added dropwise to the system. An amount of 1 molar hydrochloric acid was added to bring the quantity of HCl in the reaction medium to 0.329 mol. A homogeneous mixture was formed about one minute after adding the hydrochloric acid. The reaction solution was stirred at 5° C. for a further 30 minutes. Next, cooling was halted. The reaction mixture was then stirred for at least 12 hours before it could be used as a coating solution. The coating solution obtained had a viscosity of 4.3 mP.

The quantity of water and the described acid concentration are preferred quantities. If, for example, the acid concentration were to be doubled, a coating solution would be obtained with a viscosity of 8.5 mP. This solution could be used as a coating, however after one day it would have completely gelled. Smaller amounts of acids up to 0.15 mol can still be used.

Figure 9:
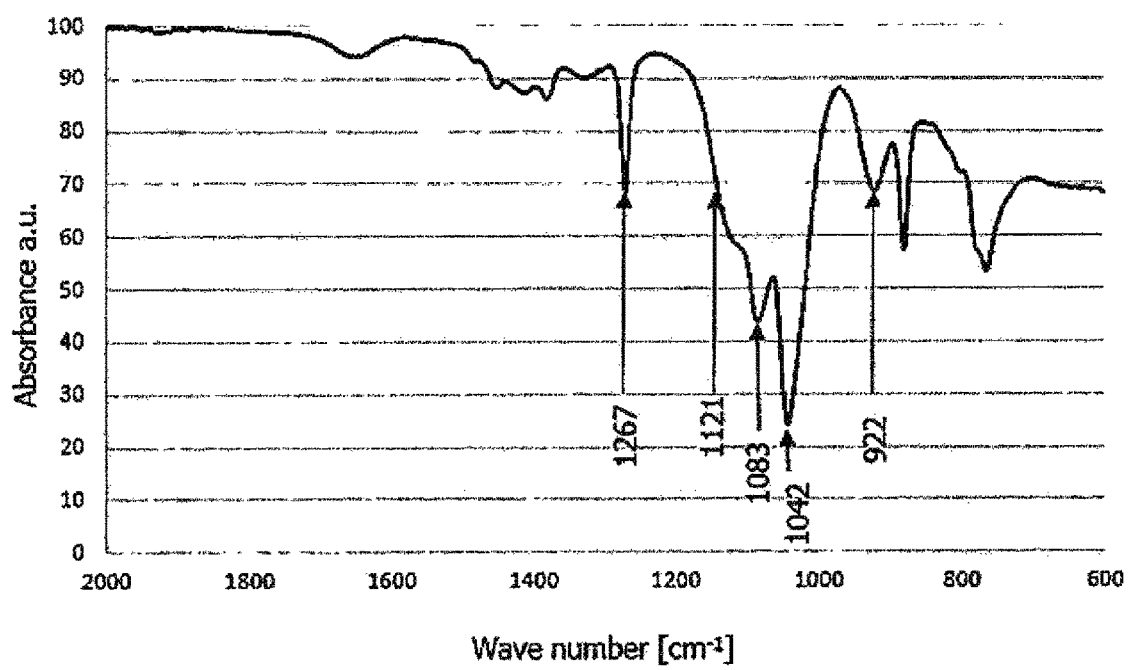
FIG. 9: shows the FT-IR spectrum (in the range 2000-600 $cm^{-1}$) of the coating solution after synthesis is complete.

FIG. 9 shows a FT-IR spectrum of the anti-corrosion protection formulation in accordance with the invention as a coating solution after the synthesis is complete. The spectrum shows that while the coating solution was being formed, the MTEOS used was not completely hydrolysed. Characteristic vibrational bands which indicate residual ethoxy groups, were at 922, 1083 and 1042 cm$^{-1}$. The band at 1121 cm$^{-1}$ indicates that condensates (Si—O—Si) which contribute to network formation were formed. The vibration band at 1267 cm$^{-1}$ could be attributed to the methyl group covalently bound to silicon (Me-Si).

Figure 10:
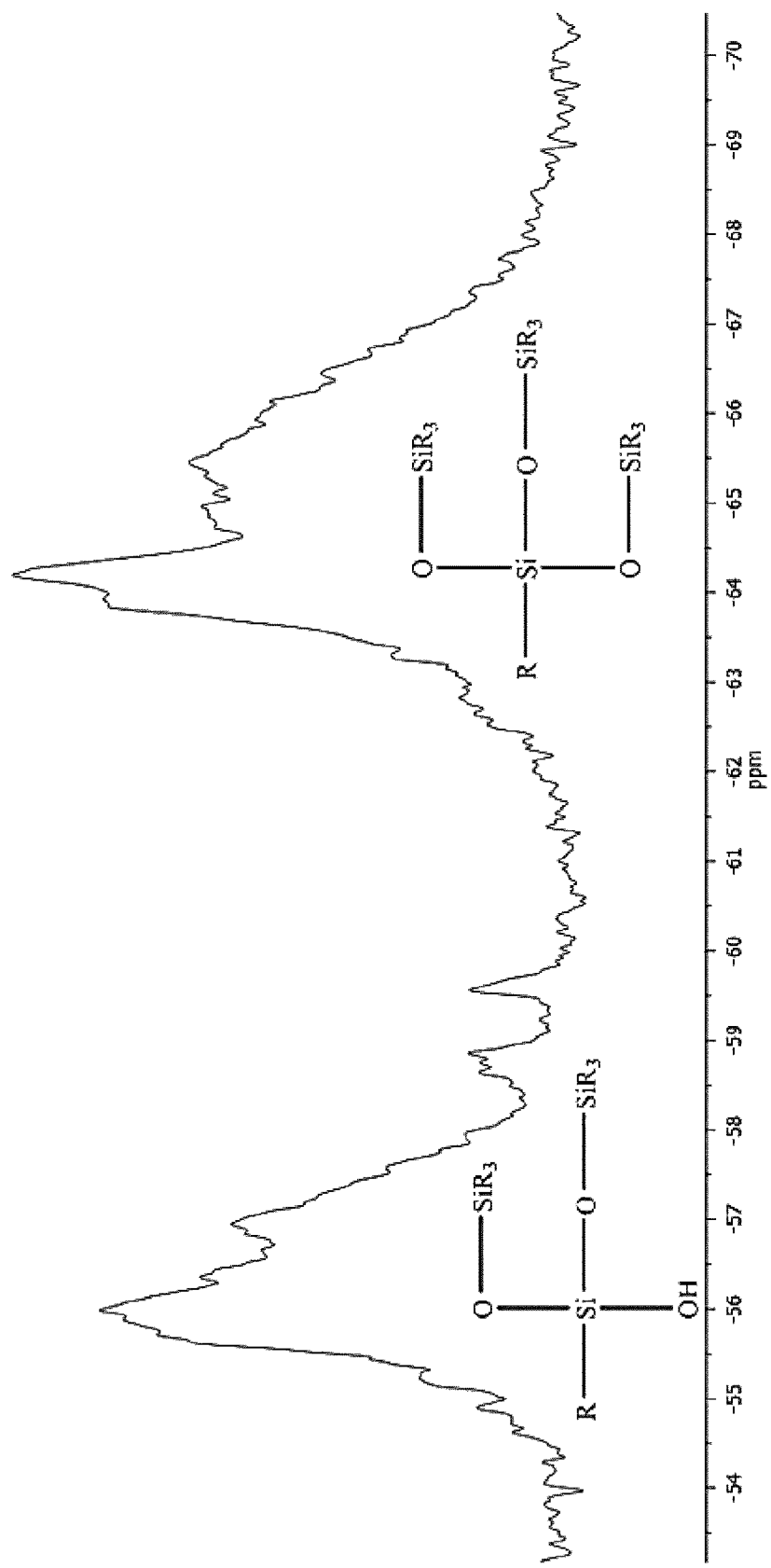
FIG. 10: shows the $^{29}Si$ NMR spectrum of the coating solution.

FIG. 10 shows the $^{29}$Si-NMR spectrum of the anti-corrosion protection formulation in accordance with the invention as a coating solution after completion of the synthesis. According to the spectrum shown, the coating solution consists of 2 essential condensation products.

The T$^3$ groups which are obtained form three siloxane bonds (Si—O—Si). These groups lead to branching and contribute to cluster formation. In contrast, the T$^2$ groups form two siloxane bonds and form the corresponding linear segments of the pre-condensed coat-forming MTEOS as the alkoxysilane precursor. In particular, during the curing process, the T$^2$ groups are required for cross-linking between the clusters which are formed. During condensation, the residual reaction sites on the condensed MTEOS can undergo further cross-linking reactions, which results in densification of the precipitated material upon (thermal/chemical) curing.

The condensation products can be specifically influenced by adjusting the educt ratios of MTEOS to water and catalyst. The composition of the condensation products has an important influence on the curing parameters. Furthermore, the composition of the T groups essentially influences the coating properties such as flexibility, hardness and resistance to solvents. As an example, coatings which are obtained from coating solutions with a high proportion of T$^3$ groups are more brittle than those with smaller proportions of T$^3$ groups. The solvent resistance increases with the proportion of T$^3$ groups in the cured coating. The flexibility, on the other hand, is promoted by the formation of fewer T$^3$ groups. Regarding the barrier properties against corrosion, it has been determined that a high proportion of T$^3$ groups is of advantage. Coatings which consist exclusively of T$^3$ groups, on the other hand, exhibit a reduced protective action.

Figure 11:
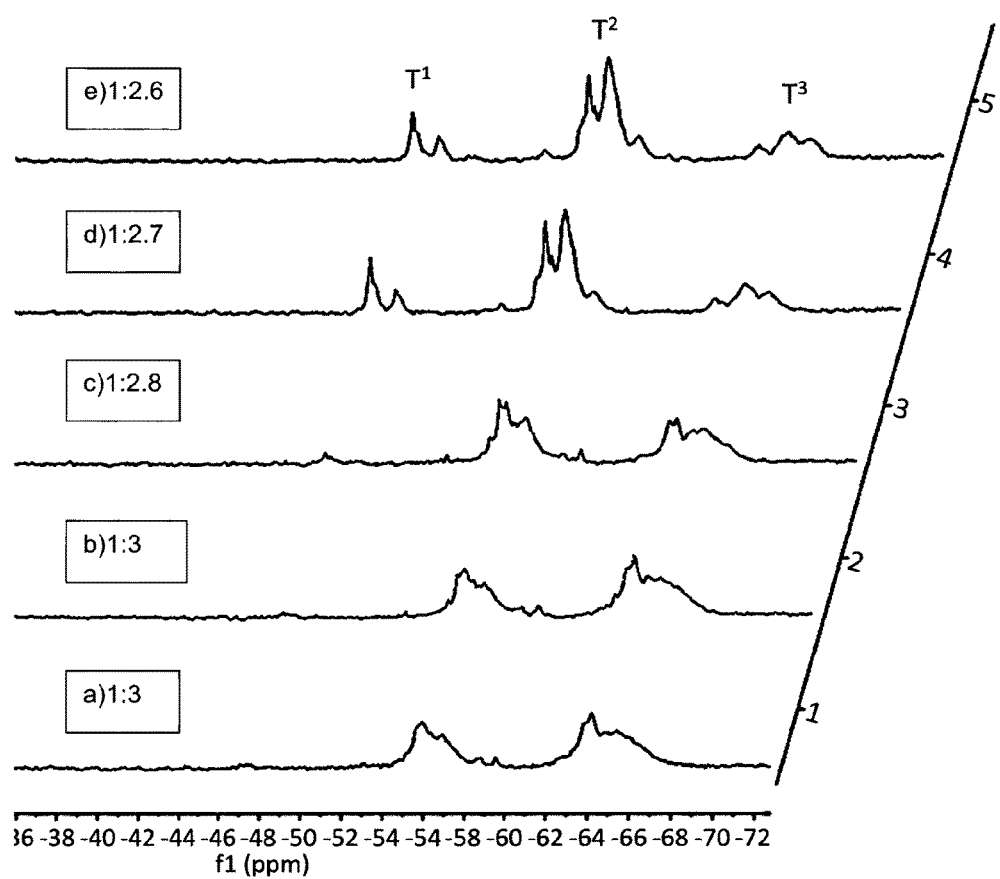
FIG. 11: shows the influence of the MTEOS/water ratio on the T-group distribution at a constant quantity of catalyst (MTEOS/catalyst ratio 1:0.003).

FIG. 11 shows the influence of the quantity of water used on the T groups formed.

The ratio of MTEOS to water used was reduced from a) to e) from 1:3 to a ratio of 1:2.6. In order to check the reproducibility of the synthesis, the coating solutions a) and b) were produced under identical conditions and ratios of MTEOS/WATER and catalyst. As can be seen from the two spectra, no differences were observed. Both the groups which were formed and the respective intensities are comparable.

Beyond a ratio of 1:2.7, significant changes in the spectrum could be observed. In addition to a significantly reduced intensity of the T$^3$ groups and a slight increase in the T$^2$ groups, the presence of simple condensed products (T$^1$) can be seen.

Both the T$^1$ groups formed as well as the lesser formation of T$^3$ groups have a positive effect on the curing temperature in the case of thermal curing. In the case of coating solutions which comprise a composition as in spectrum a and b, the optimum curing temperature is 120° C. to 140° C. In coating solutions which are produced with a MTEOS/water ratio of between 1:2.6 and 1:2.7, the optimal curing temperature is 80-120° C.

Example 2—Synthesis of Coating Solution 57 g of methyltriethoxysilane (MTEOS) and 3 g of GLYMO were placed in a 100 mL round bottom flask. The reaction solution was then cooled in an ice bath to 5° C. After the desired temperature had been reached, 9 mL of H$_2$O was slowly added dropwise to the system. An amount of 1 molar hydrochloric acid was added to bring the quantity of HCl in the reaction medium to 0.329 mol. A homogeneous mixture was formed about one minute after adding the hydrochloric acid. The reaction solution was stirred at 5° C. for a further 30 minutes. Next, cooling was halted. The reaction mixture was then stirred for at least 12 hours before it could be used as a coating solution.

Next, the ethanol and water formed as a by-product during hydrolysis by condensation of the silanol groups could be removed from the synthesised coating solution. Preferably, the by-products formed are removed under vacuum and at ambient temperature. The pressure during distillation should be less than 1 mbar. Optimally, the pressure during distillation was 10$^{-2}$ mbar to 10$^{-3}$ mbar. In order to speed things up, the temperature during the distillation could be increased. Preferably, a temperature between 30° C. and 55° C. is used.

Example 3—Coating with Dip Coater

The coating solutions produced in Example 1 could be used as a coating substrate without further modification. The dip coater used was a Linear Motor from JennyScience. Prior to coating, the steel plates to be coated were thoroughly cleaned with acetone. The substrates were then used without further pre-treatment.

In the respective coating experiments, the speeds of the immersion procedure were kept constant at 10 cm/min. The dwell time for the substrate in the coating solution was 30 seconds. After this dwell time, the substrates were drawn out of the coating solution at speeds between 2 and 11 cm/min.

By repeating the coating procedure, coating thicknesses of up to 200 μm could be obtained. After each coating step, a brief curing step was necessary at 60-120° C. for 1-20 minutes. Pre-drying for 5 minutes at 80° C. proved to be particularly suitable. After applying the last coating, complete curing of the coating was carried out at temperatures between 80° C. and 200° C. Very good results were obtained in particular at 120° C. The coatings were exposed to the temperature for 10 min-2 hours. In particular, dwell times in the curing oven of 30 min proved to be particularly suitable.

Example 4—Coating with a Brush (Painting)

A further coating method for applying the coating solution to the surface to be coated is by brush application. In order, for example, to obtain a coating thickness of approximately 160 μm, 0.041 g per cm$^2$ of the coating solution is applied and carefully distributed on the surface to be coated. In this method, the desired quantity of coating solution can be applied directly. In this coating method, defect-free coatings can be obtained even with very large amounts of paint being applied. Thus, brush application is preferred over dip coating as a coating method.

Applying the coating by brush application can be carried out with coating solutions which were produced following the instructions in Example 1 and Example 2. Coating solutions produced in accordance with Example 2 are particularly preferred.

Example 5—Coating with the 2-Component Kit Using a Brush (Painting)

When coating with the 2-component kit, a coating solution is used which is produced as described in Examples 1 and 2. In particular, the coating solutions produced as described in Example 2 are suitable for the production of the 2-component kit. The coating can either be painted on or, alternatively, be applied by means of a 2-component spray procedure.

If the 2-component kit is applied by brush application, an appropriate quantity of the coating solution is mixed with the curing component. The two components are mixed, preferably in a closed vessel, by shaking or using a magnetic stirrer. Alternatively, but less preferably, both components could be mixed in an open vessel. In open vessels, components of the component B could evaporate. Thus, the curing period and the appearance of the coating and its functionality could be compromised. A mixing ratio of 1:0.004 for the components A and B is preferred. The pot life for the 2-component kit is at least 30 minutes after mixing. During coating, it has to be ensured that the freshly applied coating does not come into contact with moisture, rain or condensation. The applied coating is ready for use after 16-24 hours. To increase the coating thickness, the coating may be applied a plurality of times or painted over a plurality of times. Coated surfaces should be overpainted at the earliest 16 hours after the first coating has been applied. There is no upper limit.

Example 6—Coating with the 2-Component Kit by Spraying

To produce a coating with the 2-component kit, a coating solution is used which is produced as described in Examples 1 and 2. In particular, the coating solutions produced as described in Example 2 are suitable for the production of the 2-component kit and for application using a spray technique.

Particularly preferably, a 2-component spray system in which both components of the kit are stored separately in pressurized containers and which are only mixed during the spraying procedure in the atomized spray is used. The pressures in the two containers in this regard should be selected such that the ratio of the components in the atomized spray is between 1:0.2 and 1:0.5.

During coating, it should be ensured that the freshly applied coating does not come into contact with moisture, rain or condensation. The applied coating is ready for use after 16-24 hours. The surfaces may be coated several times to increase the coating thickness. Coated surfaces should be coated over at the earliest 16 hours after the first coating has been applied. There is no upper limit.

Example 7—Curing in a Heating Cabinet

Curing in a heating cabinet is appropriate when curing coatings applied by dip coating or brush application. 120° C. has proved to be particularly suitable for curing the coating in order to cure the coatings completely. As a rule, the coatings are cured for 30 minutes at the appropriate temperature. Longer exposure of the coatings in the drying cabinet does not give rise to any changes in the coating properties. Defects only start to appear when the temperature selected is too high (T° C.>160° C.). When coating several times, it has proved to be useful to cure the coatings in between. A temperature of 120° C. in this regard has proved to be an advantageous temperature. If an intermediate cure were to be carried out at this temperature, no further coatings could be applied. The suitable temperature for intermediate curing was 80° C. The exposure required in the drying oven was between 5 and 15 minutes, but as a rule, 5 minutes was not exceeded and never less than this. After complete curing, the coatings could be cooled directly from the oven at ambient temperature. During cooling, no defects appeared.

Figure 12:
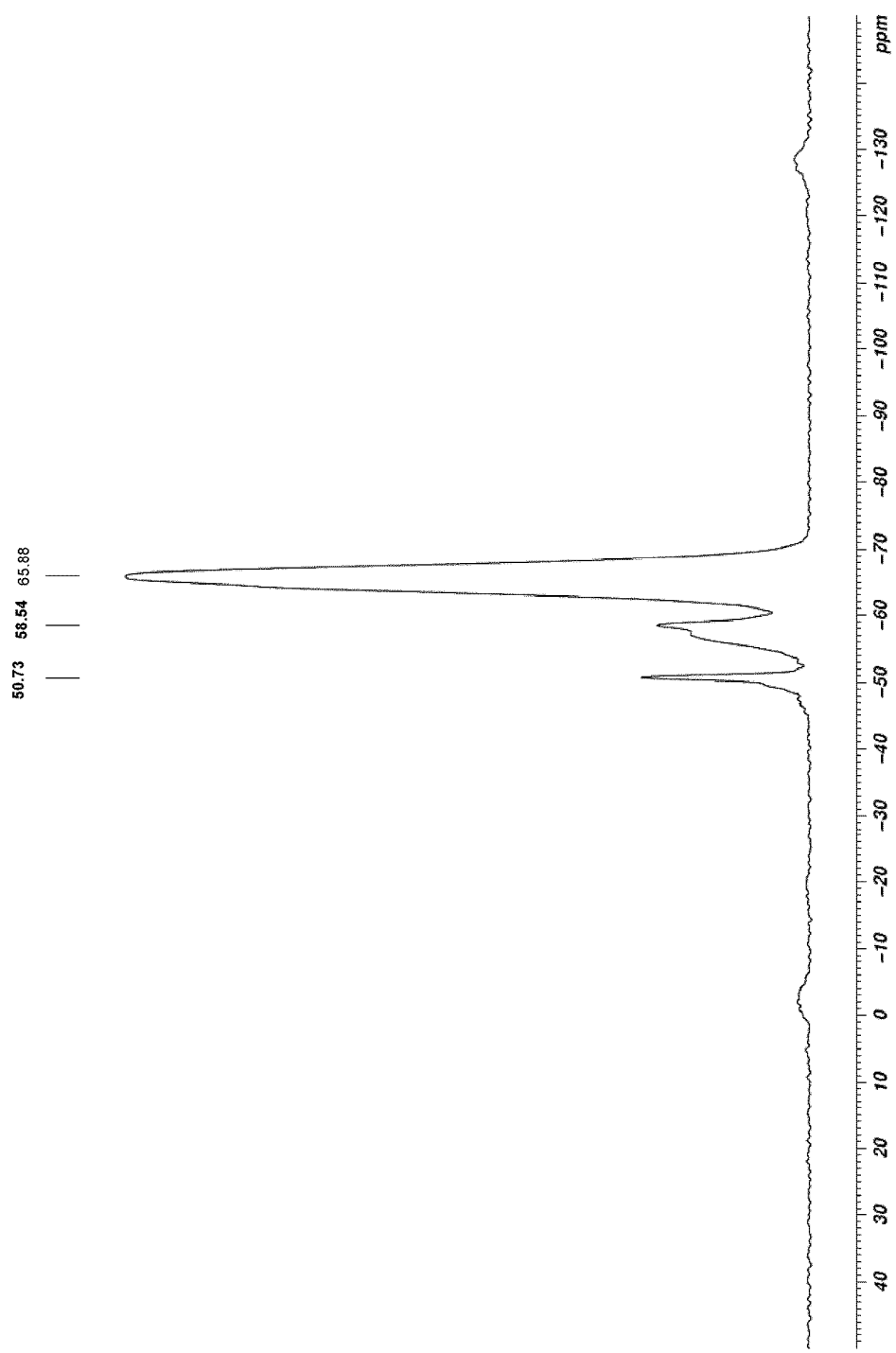
FIG. 12: shows the CP/MAS $^{29}NMR$ spectrum of a cured protective coating.
Figure 13:
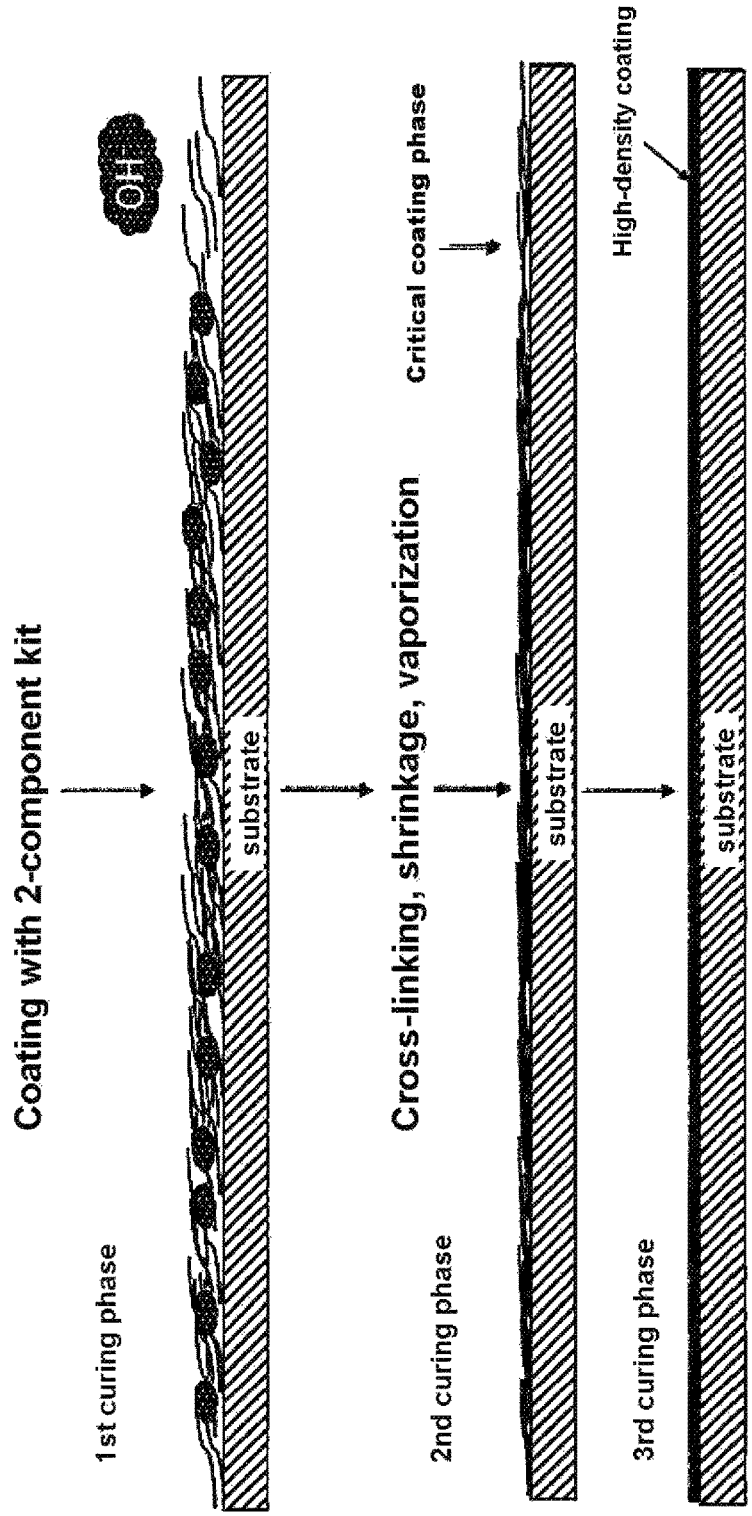
FIG. 13: diagrammatically shows the curing process for the 2-component kit.

During synthesis of the coating solution which following complete curing produced the CP/MAS $^{29}$NMR spectrum of a cured protective coating shown in FIG. 12, a ratio of MTEOS/water/catalyst of 1:2.7:0.003 was selected (synthesis as in Example 1). The coating solution obtained was applied as a film without any further modifications and was cured for 25 min at 120° C. As can be seen in FIG. 12, both $T^1$—(−50.73 ppm), $T^2$—(−58.54 ppm) and $T^3$ groups (−65.88 ppm) contributed to formation of the coating. In particular, the $T^3$ groups, which result in a dense coating structure, are in a high proportion in the coating being formed, according to the spectrum. In particular, the ratio of the T groups involved in the coating and also in the synthesis of clusters which are formed result in the specific coating properties of the protective coating.

Example 8—Curing Using Infrared Emitters

Infrared emitters can be used as a further method for curing. The curing capability was tested with an instrument from Haereus Noble Light (3.5 kW total power). It was shown that the coatings which were cured in this manner exhibited comparable results as regards the electrochemical impedance measurements ($10^{10}$ Ωcm$^2$). Even after immersion for 40 days in a 3.5% NaCl solution, the resistance was over $10^9$ Ωcm$^2$.

In order to cure the coatings, the wet coating was placed at a distance of 10 cm beneath the emitter. The intensity of the beam could be adjusted by means of an intermediate potentiometer. In particular, a 50% (1.75 kW)-100% (3.5 kW) adjustment proved to be particularly suitable. Particularly at 100% power, the desired coating properties could be obtained within a radiation period of 3 minutes.

At 100% power, the optimal curing period was between 60 and 240 seconds. An optimum was established at 180 seconds. At 75% power, the optimal curing period was between 90 and 480 seconds. The best coating properties were obtained with 360 seconds. At 50% power, the highest radiation period was necessary to obtain completely cured coatings. The optimal period was between 300 and 720 seconds.

Example 9—Characterization of Coatings

Figure 1:
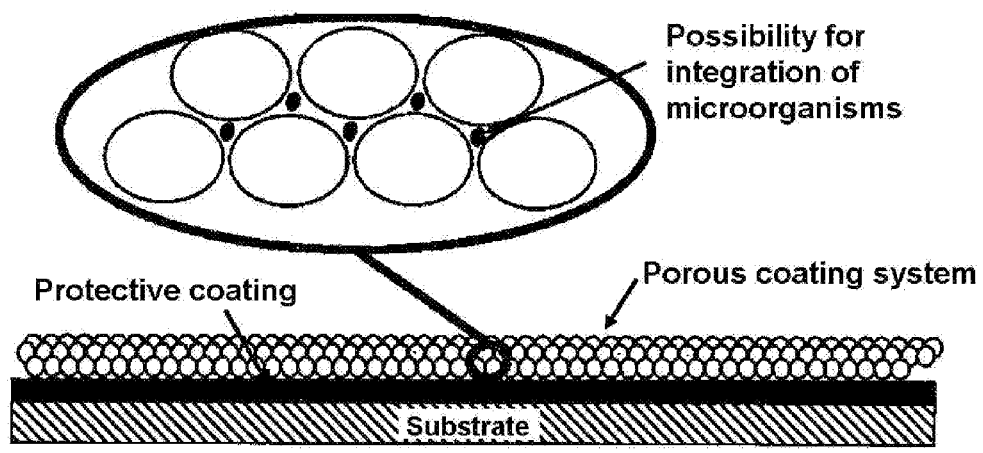
FIG. 1: diagrammatically shows the basic principle of a high-density protective coating of a porous coating system with 1 to 200 μm open pores, wherein anti-MIC organisms colonize these pores.
Figure 2:
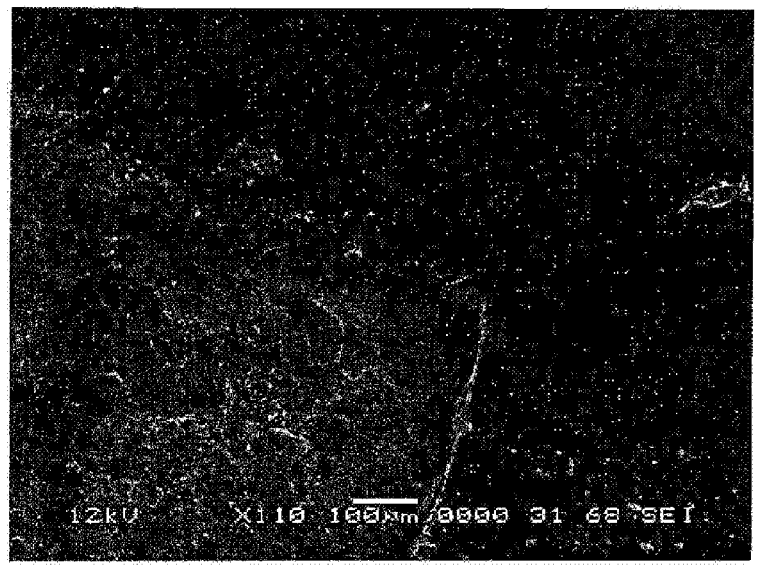
FIG. 2: shows a high-density protective coating in accordance with the invention in top view.
Figure 3:
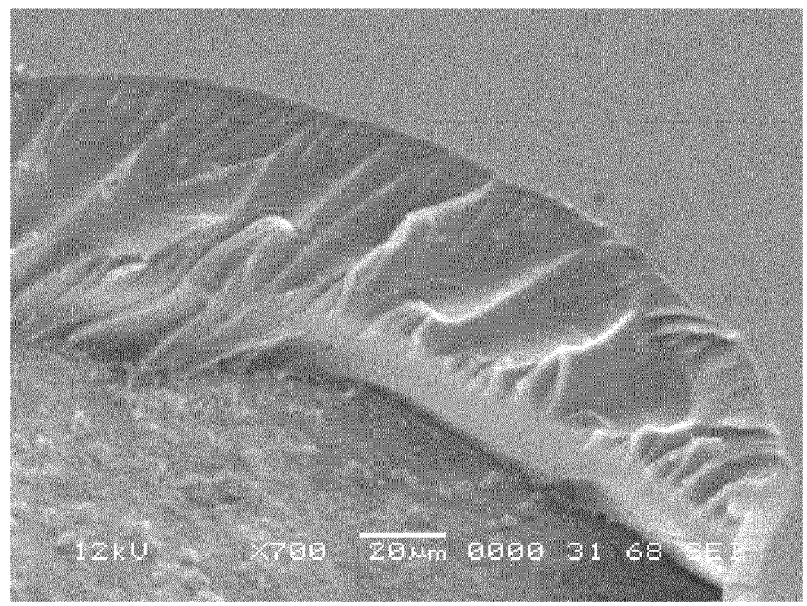
FIG. 3: Is an enlarged view of the break edge of a high-density protective coating.
Figure 4:
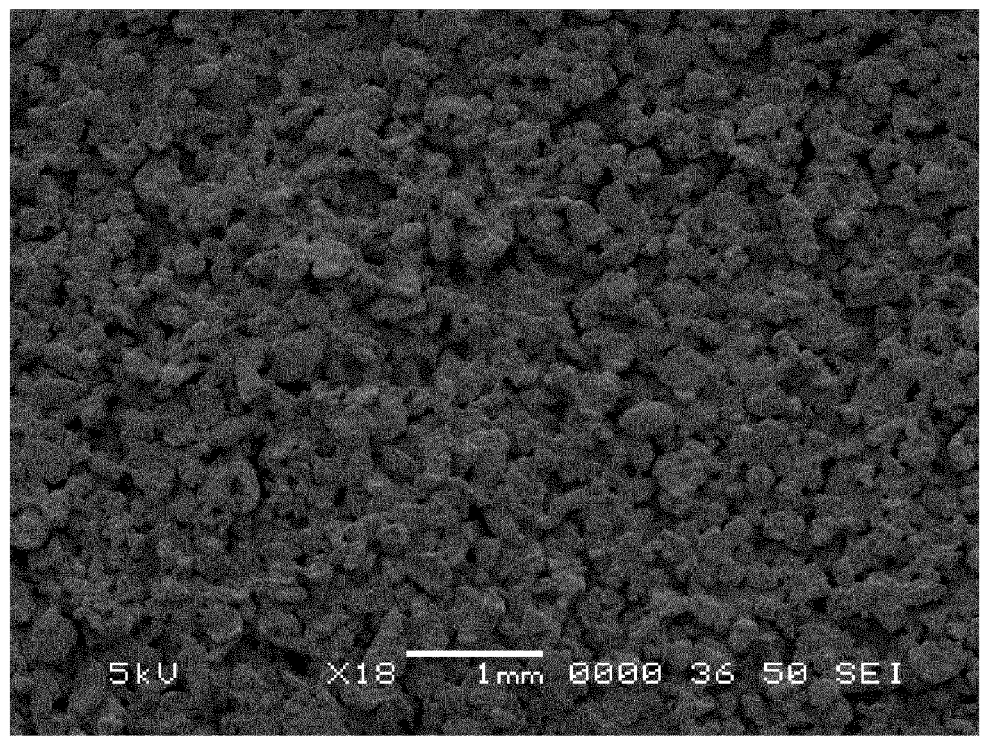
FIG. 4: shows the SEM image of the porous coating system.
Figure 5:
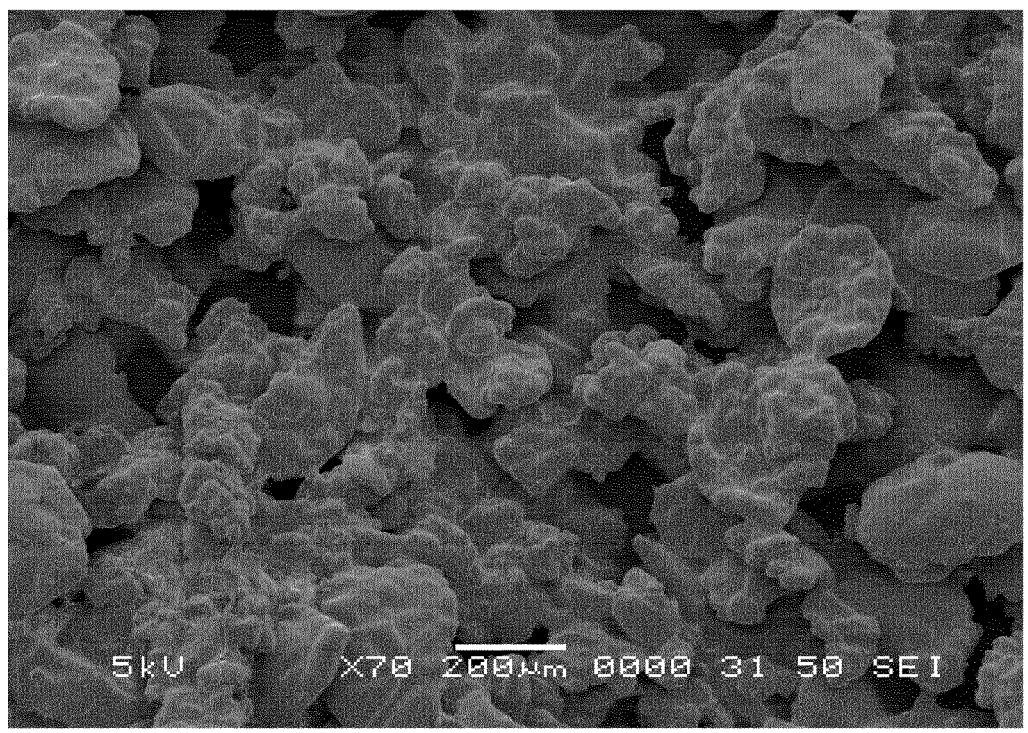
FIG. 5: shows the SEM image of the densified pore-narrowing top coat.
Figure 6:
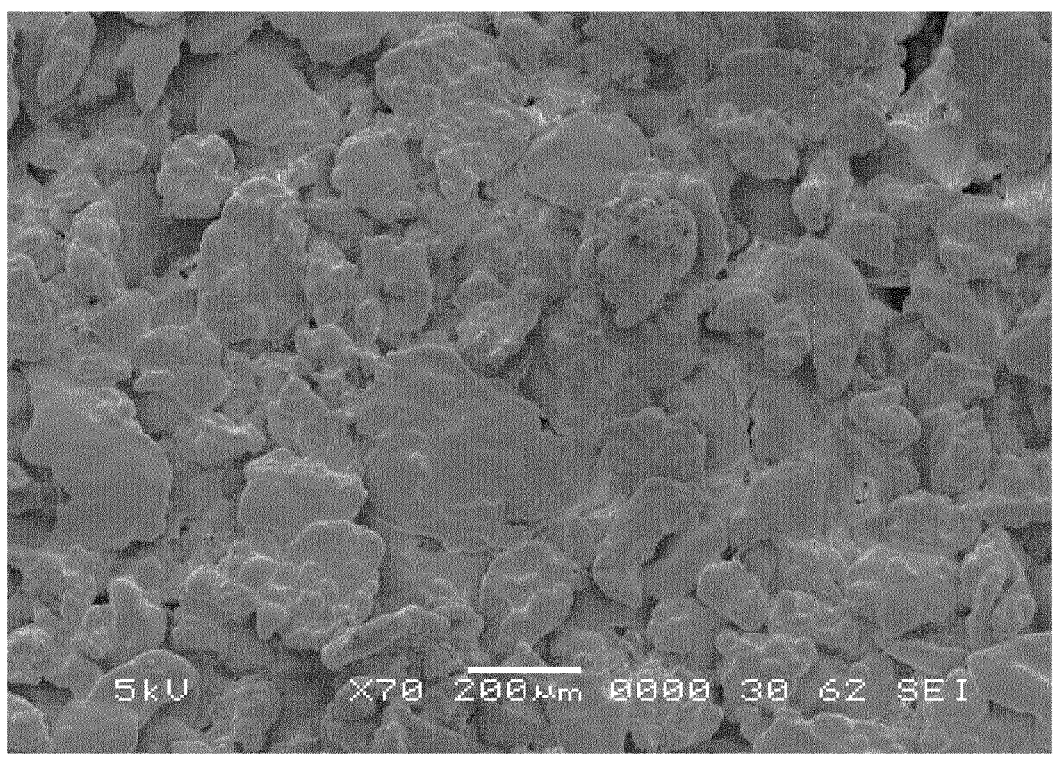
FIG. 6: shows the SEM image of the porous coating system.
Figure 7:
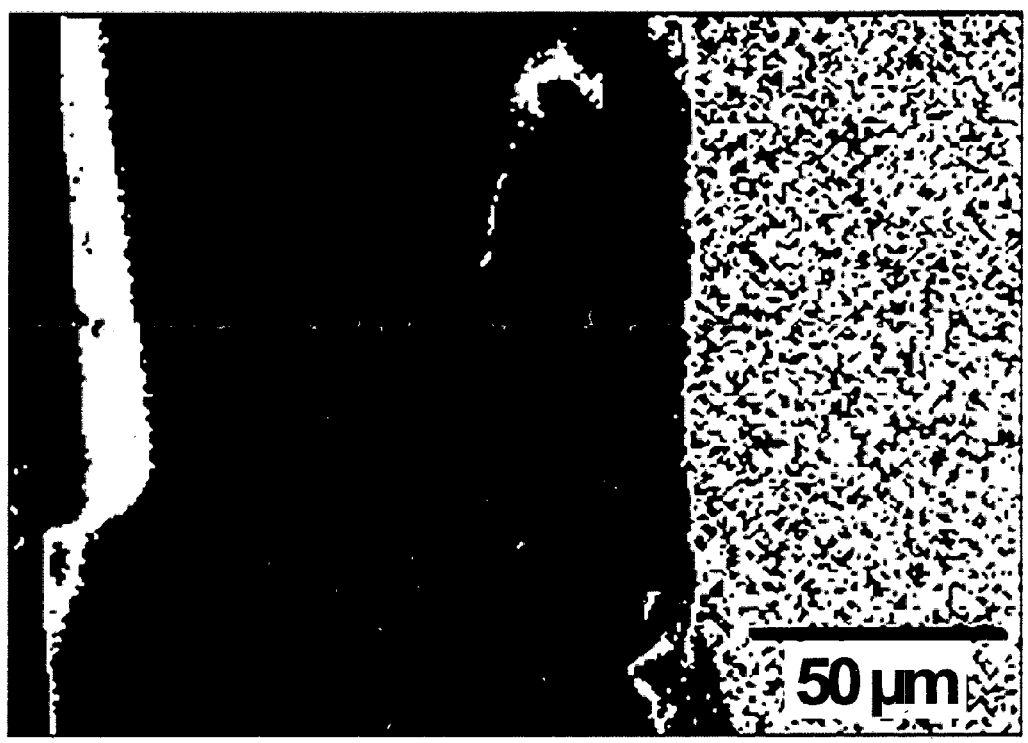
FIG. 7: shows a cross section through a steel beam (right) coated with the high-density protective coating of the invention (left).
Figure 8:
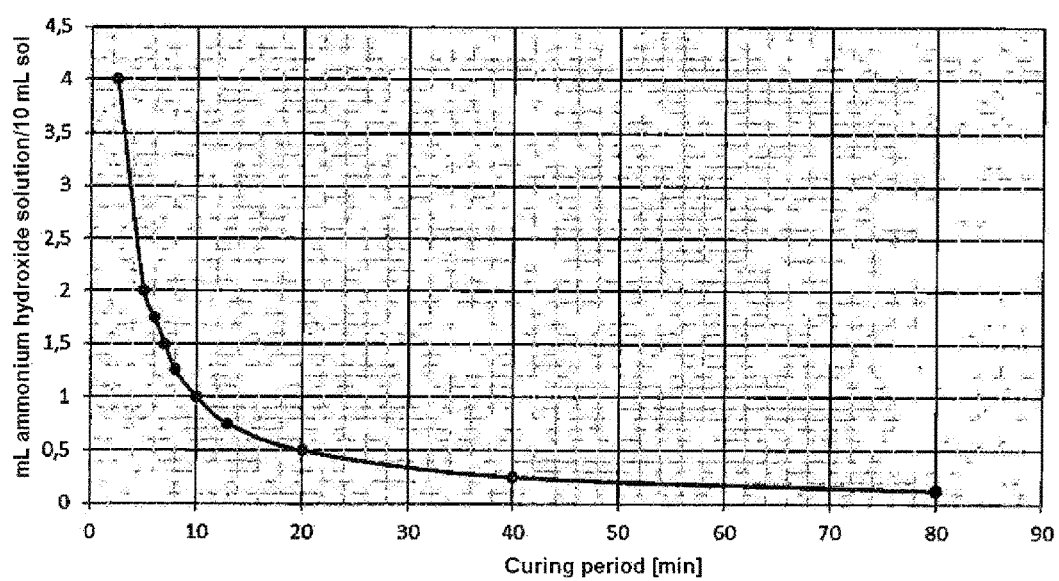
FIG. 8: Shows, as an example with a 28% ammonium hydroxide solution, the profile of the curing time as a function of the quantity of ammonium hydroxide solution used.

The MTEOS/GLYEO coatings produced in accordance with the invention were characterized by means of scanning electron microscopy (SEM). FIG. 2 shows the coating in top view. As can be seen from the image, no defects can be seen in the surface. Furthermore, the coating can be described as extremely smooth. In FIG. 3, the break edge of the coating is shown in higher magnification. This image in particular shows the good adhesion between the substrate and the coating. Furthermore, no fractures can be seen in the coating. Since the coating also has no fractures within the coating, it can be assumed that no diffusion of water or substrates which lead to corrosion takes place.

With a view to observing their suitability as an anti-corrosion coating, the coatings were examined using electrochemical impedance spectroscopy (EIS). In this measurement method, the resistance of the coating is determined. The resistance reflects the quality of the coating as regards the protective properties against corrosion. The measurements in the coating system show that, directly after immersion of the sample in 3.5% NaCl, the resistance of the coating was $10^{10}$ Ωcm$^2$. The measurement was repeated after 4 hours and after immersion in the test solution for three days. The immersion caused a slight reduction in the original value. This behaviour can be attributed to the absorption of water. This means that water is diffusing into the coating or is being absorbed by it. Even after immersion for 40 days in the test solution, very good properties were determined (constant at $10^{10}$ $\Omega cm^2$).

Example 10—Synthesis with Coating Solution for the Production of Porous Coating Systems with Large Pores 30 g of MTEOS (0.1680 mol) was placed in a round bottomed flask. 18 mL of a 28% ammoniacal solution was rapidly added, with intense stirring. The reaction mixture was stirred for at least 8 hours at ambient temperature. After 8 hours, the solution obtained could be used for the purposes of coating. The microorganisms (here *Bacillus Pumillus*) could be added after neutralization of the coating solution obtained. Alternatively, the organisms could also be integrated into the coating at a later point in time (see Example 10). Adjustment of the pH was not relevant when using spores.

Example 11—Synthesis with Coating Solution for the Production of Porous Coating Systems with Small Pores In order to obtain a denser coating system, concentrated hydrochloric acid solution was added to the material produced in Example 9 following synthesis. Next, ethanol which was produced on synthesis was slowly withdrawn under vacuum. Next, 10 mL of water was added. The coating solution obtained in this manner could be used for the production of coatings with small pore sizes.

The microorganisms could be added after neutralization of the coating solution obtained. Alternatively, the organisms could also be integrated into the coating at a later point in time (see Example 10).

Example 12—Example of a Porous Coating System Coating

After the coating solution for the protective coating in accordance with Example 1 had been produced, applied in accordance with Example 2 and cured as described in Example 4, the coating solution for the porous coating which was produced as described in Example 9 was applied. This was preferably carried out by brush application. Alternatively, the porous coating could also be applied by dropping the coating solution onto the protective coating or by dip coating. The wet coating was cured for 5-20 minutes at 60° C.-120° C. It was observed that in particular, curing the coating at 60-80° C. for 5-10 minutes was highly successful. The pores formed by this material were between 50 μm and 200 μm in size. FIG. 4 shows the SEM image of the porous coating system. The pore size of the coating material can be influenced by the addition of water. By diluting the coating substrate with water, dense coating systems are obtained. FIG. 5 shows the SEM image of the densified porous coating system. Because of the pore size, microorganisms could be integrated into the coating. A further positive effect is that the organisms can replicate within the coating system. In order to charge the coating obtained with microorganisms, a suspension of microorganisms is placed on the coating. The porous coating thus becomes infiltrated. The coating can then be used as an effective anti-corrosion coating.

Example 13—Example of a Porous Coating System Coating

After the coating solution for the protective coating in accordance with Example 1 had been produced, applied in accordance with Example 3 and cured as described in Example 5, the coating solution for the porous coating which was produced as described in Example 9 could be applied. This is preferably carried out by brush application. Alternatively, the porous coating could also be applied by dropping the coating solution onto the protective coating or by dip coating. The wet coating is cured for 5-20 minutes at 60° C.-120° C. It was observed that, in particular, curing the coating at 60-80° C. for 5-30 minutes is highly successful. In order to charge the coating obtained with microorganisms, a suspension of microorganisms is applied to the coating. Thus, the porous coating becomes infiltrated. In order to fix the microorganisms in the coating system better, the pores in a top coat should be narrowed to an extent such that the microorganisms can no longer pass through them. It has been shown that in this regard, the same coating material is suitable. In this regard, the coating material produced as described in synthesis Example 10 is applied to the porous coating as a top coat. This coating is dried at 30° C.-40° C. for 5-20 minutes. Drying at higher temperatures is not recommended, as this could lead to damaging the integrated microorganisms. As can be seen in FIG. 6, the pore size is reduced by a large factor. The remaining pore size means that substances can diffuse into the coating or substances can diffuse out of it into the environment. However, the microorganisms remained fixed in the coating because of their size.

The survivability of microorganisms was determined with the aid of fluorescent *E. coli* bacteria (with GFP, green fluorescent protein). To this end, the coating described was charged with these microorganisms. After subsequent activation of protein expression, the fluorescence could be assayed under UV light.

Example 14—Porous Coating System Coating Example

The porous coating system of the cited coating examples can also be applied with trowels. In this manner, particles produced during the synthesis of the porous material are filtered out. These particles can then be added to the remaining solution in a ratio of 1:1 to 1:10. This produces a mushy substrate which can be applied using trowels. Alternatively, water or ethanol could be added to turn the particles into a paste. Here again, a ratio of 1:1 to 1:10 can be used. After applying the material to the surface to be coated using a trowel, curing was carried out at 60° C.-80° C. for 5-30 minutes.

LIST OF REFERENCES

[1] S. Peng, Z. Zeng, W. Zhao, H. Li, Q. Xue, X. Wu, Synergistic effect of thiourea in epoxy-functionalized silica sol-gel coating for copper protection, *Surf. Coat. Technol.,* 2012, 213, 175-182.

[2] T. C. Huang, Y. A. Su, T. C. Yeh, H.-Y. Huang, C. P. Wu, K. Y. Huang, Y. C. Chou, J. M. Yeh, Y. Wei, Advanced anti-corrosive coatings prepared from electroactive epoxy-SiO$_2$ hybrid nanocomposite materials, *Electrochim. Acta,* 2011, 56, 6142-6149.

[3] R. N. Patil, B. V. Sharma, P. A. Maha, Corrosion Performance of Hybrid Epoxy Resin Coatings with Electrochemical impedance Spectroscopy, *Chem. Sin.,* 2012, 3, 458-467.

[4] M. A. Alam, E. S. M. Sherif, S. M. Al-Zahrani, Fabrication of Various Epoxy Coatings for Offshore Applications and Evaluating Their Mechanical Properties and Corrosion Behavior, *Int. J. Electrochem. Sci.,* 2013, 8, 3121-3131.

[5] U. Kharchenko, I. Beleneva, Evaluation of coatings corrosion resistance with biocomponents as antifouling additives, *Corros. Sci.,* 2013, 72, 47-53.

[6] I. A. Kartsonakis, A. C. Balaskas, E. P. Koumoulos, C. A. Charitidis, G. Kordas, ORMOSIL-epoxy coatings with ceramic containers for corrosion protection of magnesium alloys ZK10, *Prog. Org. Coat.,* 2013, 76, 459-470.

[7] F. Khelifa, M. E. Druart, Y. Habibi, F. Benard, P. Leclere, Marjorie Olivier, Philippe Dubois, Sol-gel incorporation of silica nanofillers for tuning the anti-corrosion protection of acrylate-based coatings, *Prog. Org. Coat.,* 2013, 76, 900-911.

[8] A. Kartsonakis, E. P. Koumoulos, A. C. Balaskas, G. S. Pappas, C. A. Charitidis, G. C. Kordas, Hybrid organic-inorganic multilayer coatings including nanocontainers for corrosion protection of metal alloys, *Corros. Sci.,* 2012, 57, 56-66.

[9] F. Andreatta, L. Paussa, P. Aldighieri, A. Lanzuttia, D. Raps, L. Fedrizzi, Corrosion behaviour of sol-gel treated and painted AA2024 aluminium alloy, *Prog. Org. Coat.,* 2010, 69, 133-142.

The invention claimed is:

1. An anti-corrosion coating to protect against corrosion, comprising
a high-density protective coating with a low defect density and having no fractures, agglomerates or pores with dimensions in the millimetric or micrometric range on a substrate which is prone to corrosion, said high-density protective coating containing pre-condensed coat-forming alkoxysilane precursors,
wherein the molecules of the pre-condensed coat-forming alkoxysilane precursors are linear and short-chained alkoxysilanes, consisting of least 2 to 1000 monomers, and built up from monomer units of the alkoxysilane precursor employed,
wherein the molecules of the pre-condensed coat-forming alkoxysilane precursors are cross-linked with each other,
wherein the high-density protective coating has a coating thickness of at least 50 µm,
wherein the anti-corrosion coating further comprises a porous coating system with open pores having a pore diameter ranging from 1 to 200 microns,
wherein the porous coating system is applied to the high-density protective coating, and
wherein the porous coating system is formed from cross-linked alkoxysilane precursors, and organisms acting against microbially influenced corrosion colonize the pores.

2. The anti-corrosion coating as claimed in claim 1, wherein the alkoxysilane precursor is methyltriethoxysilane and/or tetraethoxyorthosilicate and/or tetramethoxyorthosilicate and/or methyltrimethoxysilane and/or dimethyldiethoxysilane and/or phenyltriethoxysilane.

3. The anti-corrosion coating as claimed in claim 1, wherein the high-density protective coating contains up to 20% by weight of adhesion promoter.

4. The anti-corrosion coating as claimed in claim 3, wherein the adhesion promoter is 3-glycidyloxypropyltriethoxysilane and/or 3-glycidyloxypropyltrimethoxysilane and/or 3-glycidoxypropylmethyldiethoxysilane and/or 3-glycidoxypropylmethyldimethoxysilane and/or 2-(3,4-epoxycyclohexyl)ethyltrimethoxysilane and/or 2-(3,4-epoxycyclohexyl)-ethyltriethoxysilane and/or 3-aminopropyltriethoxysilane and/or 3-aminopropylmethyldiethoxysilane and/or aminopropyltrimethoxysilane and/or (3-trimethoxysilylpropyl)diethylentriamine and/or aminoethylaminopropyltrimethoxysilane and/or aminoethylaminopropyltriethoxysilane and/or aminoethylaminopropylmethyldimethoxysilane.

5. The anti-corrosion coating as claimed in claim 1, wherein the high-density protective coating contains up to 22.5% by weight of particulate material.

6. The anti-corrosion coating as claimed in claim 1, wherein a porous top coat formed from
cross-linked alkoxysilane precursors is applied to the porous coating system,
wherein the porous top coat comprises pores with a pore diameter of less than 5 µm.

* * * * *